United States Patent [19]
Nisikawa

[11] Patent Number: 5,821,995
[45] Date of Patent: Oct. 13, 1998

[54] METHOD AND APPARATUS FOR CONTROLLING TRANSMISSION OF MULTIPLEXED VIDEO SIGNALS

[75] Inventor: Hiroyuki Nisikawa, Koganei, Japan

[73] Assignee: Hitachi Denshi Kabushiki Kaisha, Tokyo, Japan

[21] Appl. No.: 635,699

[22] Filed: Apr. 22, 1996

Related U.S. Application Data

[63] Continuation-in-part of Ser. No. 361,724, Dec. 23, 1994, Pat. No. 5,701,581.

[30] Foreign Application Priority Data

| Apr. 25, 1995 | [JP] | Japan | 7-100941 |
| Nov. 9, 1995 | [JP] | Japan | 7-291139 |

[51] Int. Cl.$^6$ .................................................. H04N 9/04
[52] U.S. Cl. ............................ 348/212; 370/433; 348/722
[58] Field of Search .................................... 348/212, 426, 348/423, 722; 370/433, 468; H04N 9/04

[56] References Cited

U.S. PATENT DOCUMENTS

| 4,581,647 | 4/1986 | Vye | 348/212 |
| 4,583,609 | 4/1986 | Smith | 348/212 |
| 4,782,393 | 11/1988 | Kawamura | 348/212 |
| 4,878,242 | 10/1989 | Springer et al. | 379/204 |
| 4,888,795 | 12/1989 | Ando et al. | 348/18 |
| 4,949,181 | 8/1990 | Elberbaum | 348/212 |
| 4,954,886 | 9/1990 | Elberbaum | 348/212 |
| 5,079,634 | 1/1992 | Hosono | 348/212 |
| 5,229,850 | 7/1993 | Toyoshima | 358/108 |
| 5,231,492 | 7/1993 | Dangi et al. | 348/15 |
| 5,371,534 | 12/1994 | Dagdeviren et al. | 348/16 |
| 5,392,284 | 2/1995 | Sugiyama | 348/17 |
| 5,396,269 | 3/1995 | Gotoh et al. | 348/14 |
| 5,400,068 | 3/1995 | Ishida et al. | 348/16 |
| 5,402,418 | 3/1995 | Shibata et al. | 370/62 |
| 5,408,261 | 4/1995 | Kamata et al. | 348/17 |
| 5,412,418 | 5/1995 | Nishimura et al. | 348/17 |
| 5,450,140 | 9/1995 | Washino | 348/212 |
| 5,623,304 | 4/1997 | Ota | 348/212 |
| 5,633,873 | 5/1997 | Kay | 370/433 |
| 5,663,961 | 9/1997 | McRoberts | 370/473 |

FOREIGN PATENT DOCUMENTS

| 0271969 | 6/1988 | European Pat. Off. | H04N 7/18 |
| 0589657 | 3/1994 | European Pat. Off. . |
| 0661883 | 7/1995 | European Pat. Off. . |
| 91/02414 | 2/1991 | WIPO | H04B 1/66 |

OTHER PUBLICATIONS

Patent Abstracts of Japan, vol. 11, No. 240 (E–529), Aug. 6, 1987 (for JP–A–62–53095, H. Kuroda et al., published Mar. 7, 1987).

J. Kristen et al., "One coax cable carries video and power", Electrical Design News, vol. 36, No. 6, Mar. 14, 1991, pp. 137–138, 140.

U.S. Patent Application Serial No. 08/662,141 filed on Jun. 12, 1996.

U.S. Patent Application Serial No. 08/839,489 filed on Apr. 14, 1997.

U.S. Patent Application Serial No. 08/877,560 filed on Jun. 17, 1997.

M. Kato et al., "Visual Communication System in an Apartment House Using Only Twisted Paired Cable", *IEEE Transactions on Consumer Electronics*, vol. 40, No. 3, Aug. 1994, pp. 418–426.

Primary Examiner—Howard W. Britton
Attorney, Agent, or Firm—Antonelli, Terry, Stout & Kraus, LLP

[57] ABSTRACT

In a transmission system for bi-directionally transmitting and receiving a plurality of signals between two units, interconnected through a predetermined transmission path, if one of the plurality of signals falls into any of a transmission disabled state, a transmission not required state, a reception disabled state, and a reception not required state, at least one of a transmission operation and a reception operation for the signal in the one state is stopped or set into a stand-by state, thereby reducing electric power consumed by the transmission system. In addition, a transmission bandwidth of the transmission path is reduced by a portion associated with the signal in the one state, or an entire bandwidth for all signals except for the signal in the one state is expanded without changing the transmission bandwidth of the transmission path.

22 Claims, 9 Drawing Sheets

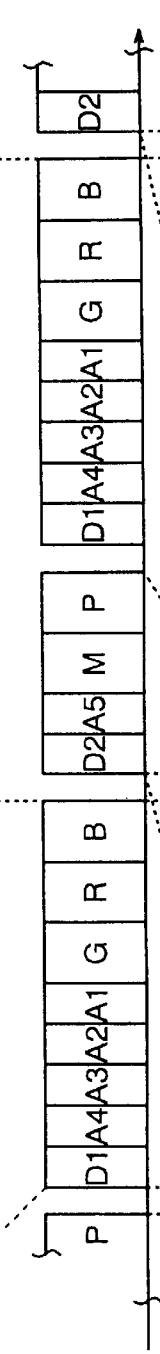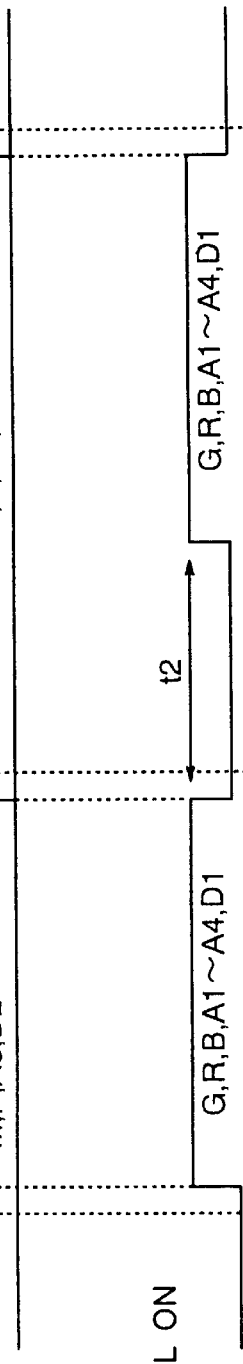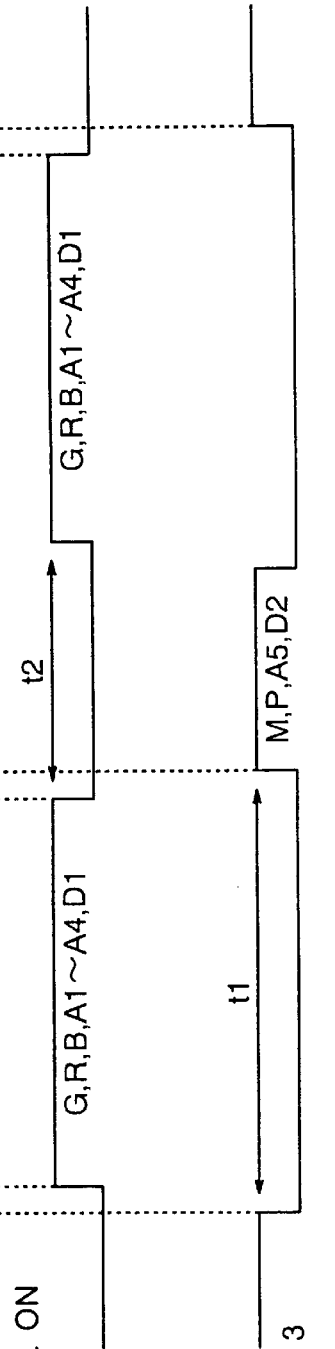

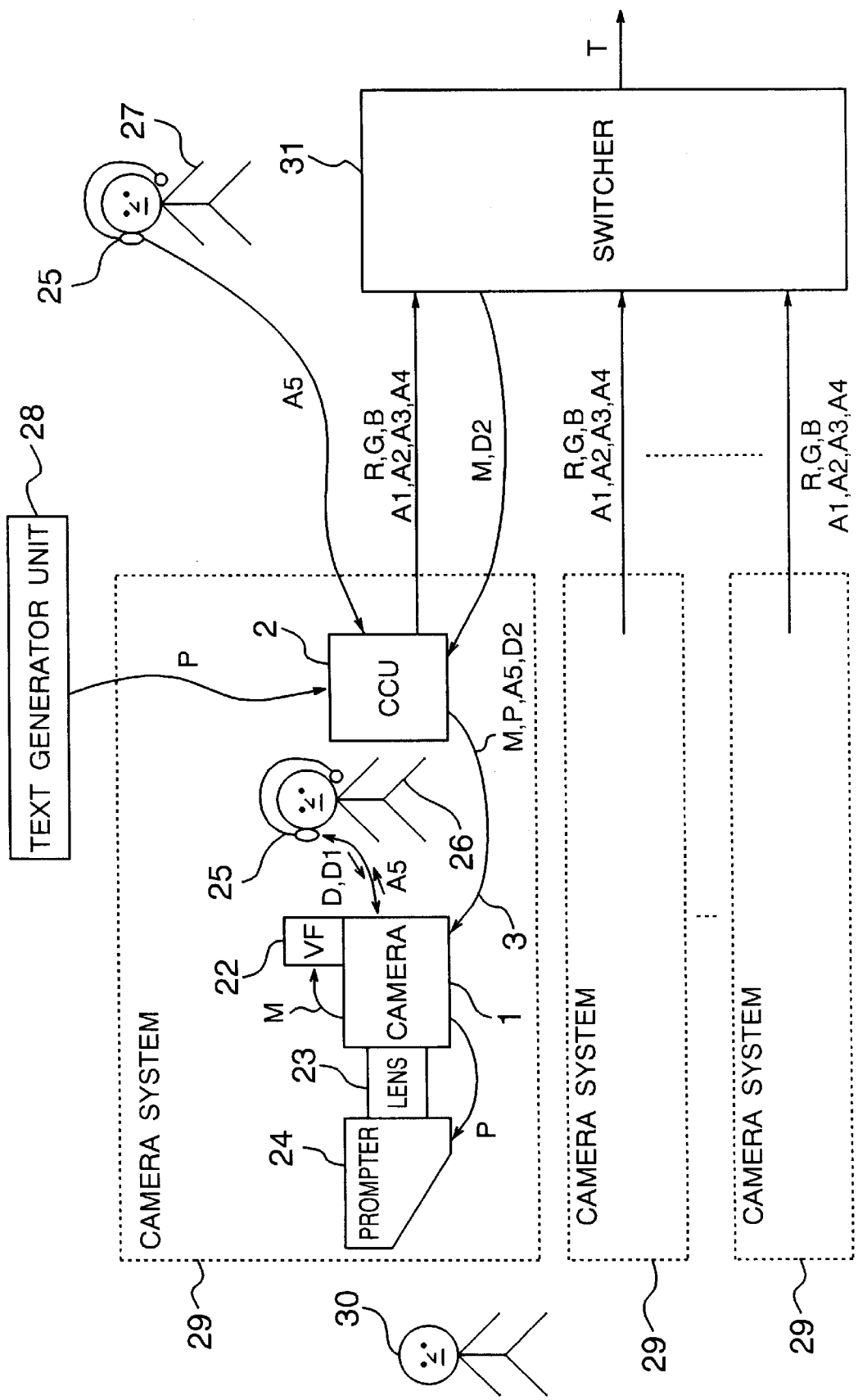

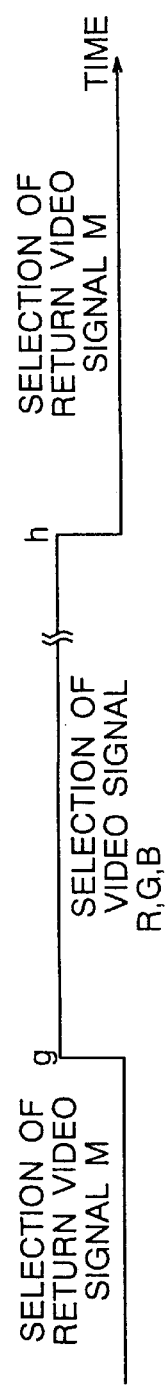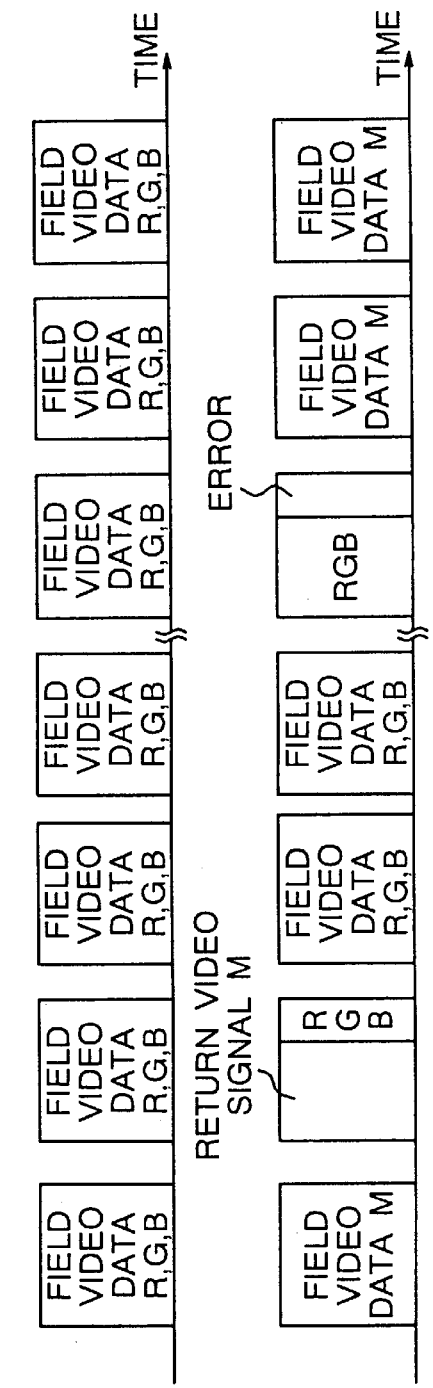
FIG. 5(a) CONTROL SIGNAL D
FIG. 5(b) RETURN VIDEO SIGNAL M
FIG. 5(c) VIDEO SIGNALS R,G,B
FIG. 5(d) VF VIDEO SIGNAL

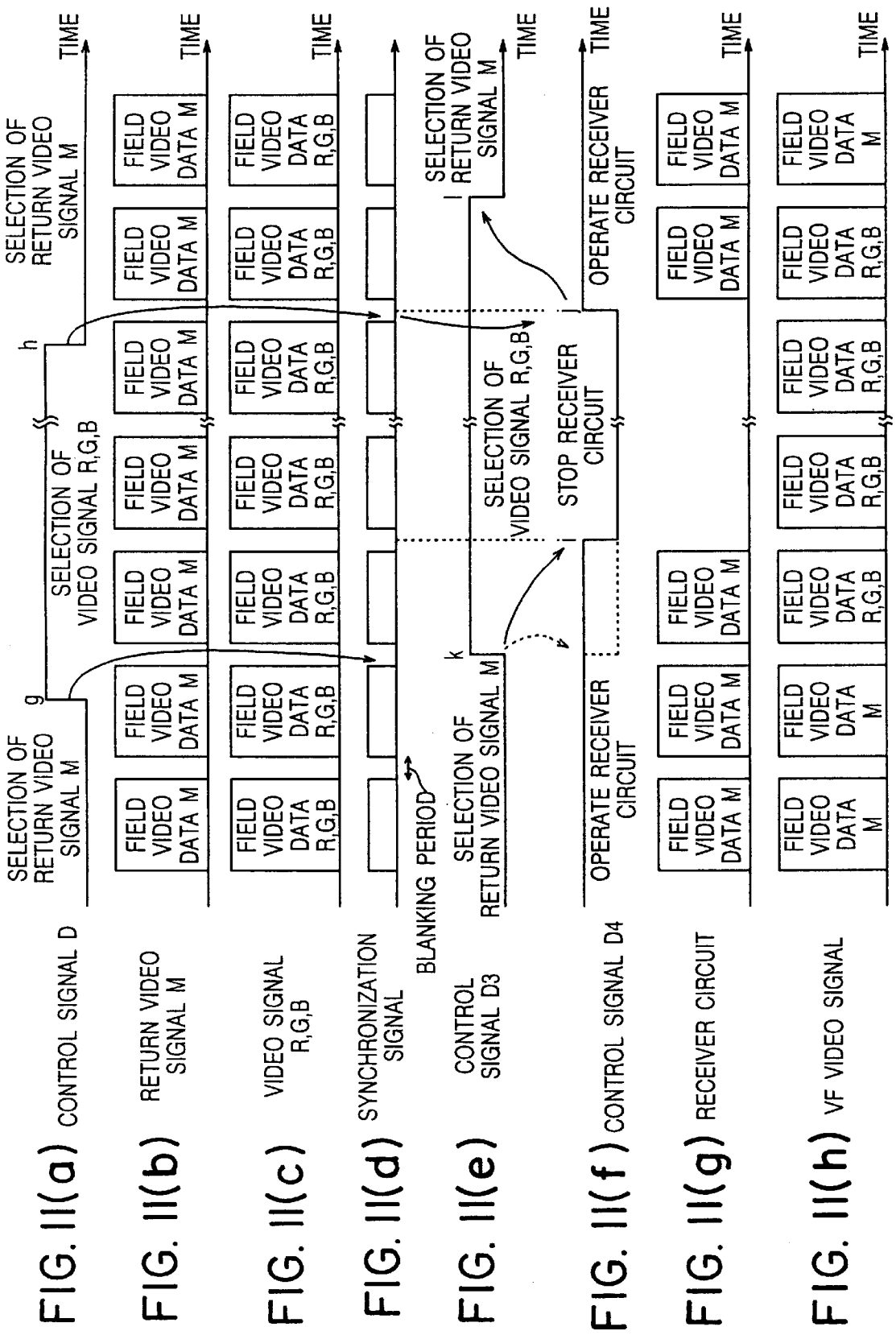

1

METHOD AND APPARATUS FOR CONTROLLING TRANSMISSION OF MULTIPLEXED VIDEO SIGNALS

CROSS-REFERENCES TO RELATED APPLICATIONS

This is a continuation-in-part of U.S. Ser. No. 08/361,724 filed Dec. 23, 1994, now U.S. Pat. No. 5,701,581, the contents of which is incorporated herein by reference.

BACKGROUND OF THE INVENTION

The present invention relates to an apparatus and method for bi-directionally transmitting multiplexed video, audio and control signals and so on between two video apparatuses such as a television camera (hereinafter abbreviated as the "camera"), a camera control unit (hereinafter referred to as the "CCU"), and so on.

Conventionally, there is known an apparatus for bi-directionally transmitting multiplexed video, audio and control signals and so on between a camera and a CCU connected thereto, which employs a triple coaxial cable called "TRIAX cable" (hereinafter abbreviated as the "cable") for frequency division multiplexing these signals and transmitting the frequency division multiplexed signals.

For example, assuming that a camera 1 is connected to a CCU 2 as illustrated in FIG. 1, three types of video signals, i.e., red, green and blue video signals R, G, B, four types of audio signals A1, A2, A3, A4, and a control signal D1 for controlling the CCU 2 are sent from the camera 1 to the CCU 2. On the other hand, a return image signal M for monitoring generated by the CCU 2, a prompt video signal P for displaying a text to an announcer, an audio signal A5 for giving instructions to a camera man, and a control signal D2 for controlling the operation of the camera 1 are sent from the CCU 2 to the camera 1.

These signals amplitude-modulate (AM) associated carriers at different frequencies from each other and occupy different frequency bands, thereby accomplishing continuous bi-directional transmission of all these signals. An entire transmission bandwidth of a transmission path in this case is designated by W1 in FIG. 2.

It should be noted here that a variety of signals are involved in a bi-directional transmission system as mentioned above, and in this specification, signals associated with the transmission (i.e., a transmitted signal, a signal to be transmitted by a certain unit, and so on) are called "transmission signals" and signals associated with the reception (i.e., a received signal, a signal to be received by a certain unit or circuit, and so on) are called "reception signals" for simplicity of description.

Recently, there have been developed techniques, wherein video, audio and control signals and so on are digitized, time-division-multiplexed, time-base-compressed to generate a transmission signal composed of alternating signal periods and non-signal periods, and a transmission signal from one end (for example, the CCU side) of a transmission path is transmitted during a non-signal period $t_1$ of a transmission signal from the other end (for example, the camera side), such that all signals from both sides can be bi-directionally transmitted through a single transmission path, for example, as described in U.S. Ser. No. 08/361,724 filed Dec. 23, 1994 and EP Patent Application No. 94309860.8 filed Dec. 28, 1994, both assigned to the same assignee as the present application.

Here, video signals R, G, B, audio signals A1, A2, A3, A4, a return video signal M, a prompt video signal P, and an audio signal A5, shown in both of the transmission methods, will be explained with reference to FIG. 4.

The video signals R, G, B, and the audio signals A1, A2, A3, A4 are generated as on-air signals T by a switcher 31 and are always monitored.

The return video signal M is provided for displaying video signals R, G, B taken by another camera system 29 connected to the switcher 31 or a video signal T currently on air in a view finder (hereinafter abbreviated as "VF") 22 of a camera 1 so as to allow a camera man 26 to monitor these video signals. Generally, the camera man 26 instructs the camera 1 to display a video image taken by himself with the camera 1 on the view finder 22. The return image signal M is required only when the camera man 26 checks what image the other camera system 29 is currently taking, which image is now on air by the switcher 31, or the like.

The prompt video signal P, generally generated in a text generator unit 28, is used to display a text to be read by an announcer 30 on a prompter 24. Thus, the prompt video signal P is not required when the announcer 30 does not need such a text, or when the prompter 24 and the text generator unit 28 are not connected to the switcher 31.

The audio signal A5 is provided for a director 27 to give instructions to the camera man 26 through a microphone, and is not required when the director 27 does not give instructions. The audio signal A5 from an intercom 25 of the director 27 is supplied to the camera 1 through the CCU 2 and the transmission path 3, and then to an intercom 25 of the camera man 26, and reproduced by a pair of headphones of the camera man 26.

SUMMARY OF THE INVENTION

In the transmission system described above, the return video signal M, the prompt video signal P and the audio signal A5 are continuously transmitted and processed even if a return video image is not checked, no text is displayed, or no instructions are given to the camera man.

Thus, since the transmission related operations are continuously being performed on signals which are only temporarily required, circuits associated with these signals are continuously operating to cause useless power consumption.

Also, since these temporarily required signals continuously occupy a predetermined transmission bandwidth, a wide transmission bandwidth is always necessary, causing a problem that transmission bandwidths assigned to other signals, particularly, the transmission bandwidths assigned to the video signals R, G, B are limited so that the transmission quality cannot be improved for these video signals.

In addition, when the camera man 26 performs a selection manipulation to switch between a return video signal M displayed on the view finder 22 of his camera 1 and video signals R, G, B currently taken by his camera 1, a video image displayed on the view finder 22 may be switched at timing a or at timing h which is in the middle of video image data generally formatted in the unit of field or frame, as illustrated in FIG. 5, depending upon the timing at which the camera man 26 performs the selection manipulation. This may result in a problem that a video image on the view finder 22 or the synchronization of the video image is disturbed to interfere with the operation of the camera.

It is an object of the present invention to provide a signal transmission method and apparatus adapted to the case where at least one of a plurality of transmission signals is not necessary or is disabled (unusual) to reduce useless power consumption caused by the operation of a transmitter circuit associated with the unnecessary transmission signal or the disabled transmission signal, as well as adapted to the case where at least one of a plurality of reception signals is not necessary or is disabled (unusual) to reduce useless power consumption caused by the operation of a receiver circuit associated with the unnecessary reception signal or the disabled reception signal.

It is an aim of the present invention to provide a signal transmission control method and apparatus which are capable of transmitting signals with minimized power consumption and a narrowest possible transmission bandwidth and without changing the quality of the signals to be transmitted.

It is another aim of the present invention to provide a signal transmission control method and apparatus which are capable of transmitting signals with minimum power consumption, and of improving the quality of a signal which requires the highest quality without changing a transmission bandwidth.

It is another aim of the present invention to provide a signal transmission control method and apparatus which are effective when a transmission signal or a reception signal is selectively switched from one to another, to prevent disturbance of the switched signal.

According to one aspect of the present invention, a transmission control method for use in a transmission system for bi-directionally transmitting a plurality of signals between two transmission/reception units interconnected through transmission means, comprises the step executed when at least one of the plurality of signals is subjected to one of a transmission disabled condition, a transmission not required state, a reception disabled state and a reception not required state, for stopping or setting into a stand-by condition at least one of a transmission operation or a reception operation for the at least one signal of the plurality of signals remaining in the one state.

In one example of the present invention, the transmission control method comprises the step of reducing a transmission bandwidth of the transmission means by a predetermined bandwidth in accordance with a bandwidth assigned to the at least one signal of the plurality of signals.

In one example of the present invention, the transmission control method further comprises the step of expanding a transmission bandwidth for at least one predetermined signal of the remaining signals except for the at least one signal within the plurality of signals by a predetermined bandwidth without changing the transmission bandwidth of the transmission means.

Preferably, the predetermined bandwidth is a bandwidth assigned to the at least one signal of the plurality of signals In one example of the present invention, the transmission means comprises a single transmission path, and the plurality of signals are bi-directionally transmitted in a time-division-multiplex manner between the two units through the transmission means.

Also, in one example of the present invention, the transmission control method further comprises, in one transmission/reception unit of the two transmission/reception units, the step of selectively outputting to an output terminal of the one transmission/reception unit, a reception signal transmitted from the other transmission/reception unit of the two transmission/reception units to the one transmission/reception unit through the transmission means and a transmission signal transmitted from the one transmission/reception unit to the other transmission/reception unit through the transmission means.

The selectively outputting step further comprises the steps of outputting the transmission signal to the output terminal during a non-signal period of the transmission signal instead of the reception signal, when switching a signal to be outputted to the output terminal from the reception signal to the transmission signal, and starting a reception operation for the reception signal, and outputting the reception signal to the output terminal during a non-signal period of the reception signal instead of the transmission signal after the reception operation has been properly performed, when switching a signal outputted to the output terminal from the transmission signal to the reception signal.

According to another aspect of the present invention, in a transmission system for bi-directionally transmitting a first plurality of signals and a second plurality of signals through transmission means between a first transmission/reception unit and a second transmission/reception unit interconnected through the transmission means, the first transmission/reception unit comprises first transmission means for transmitting the first plurality of signals to the transmission means; first determination means for determining states of the plurality of signals to be transmitted; first control means responsive to a determination result of the first determination means for stopping or setting into a stand-by state a transmission operation in the first transmission means for at least one signal within the first plurality of signals corresponding to the determination result; and first reception means for receiving the second plurality of signals transmitted from the second transmission/reception unit through the transmission means, and the second transmission/reception unit comprises second reception means for receiving the first plurality of signals transmitted from the first transmission/reception unit through the transmission means; second determination means for determining states of the first plurality of signals received by the second reception means; second control means responsive to a determination result of the determination means for stopping or setting into a stand-by state a reception operation in the second reception means for at least one signal within the first plurality of signals; and second transmission means for transmitting the second plurality of signals to the transmission means, wherein the first control means is responsive to a first determination result made by the first determination means that at least one signal of the first plurality of signals is in one of a transmission disabled state and a transmission not required state as the determination result, to stop or set into a stand-by state a transmission operation in the first transmission means for at least one signal of the first plurality of signals indicated by the first determination result, and the second control means is responsive to a second determination result made by the second determination means that at least one signal of the first plurality of signals is in one of a reception disabled state and a reception not required state as the determination result, to stop or set into a standby state a reception operation in the second reception means for the at least one signal of the first plurality of signals indicated by the second determination result.

More specifically, to achieve the above object, for a signal currently having no information to be transmitted, a signal determined to be unusual (i.e., transmission disabled signal), a signal not required to be transmitted (i.e., transmission not required signal), or a signal not required to be received (i.e., reception not required signal) within a variety of signals to be transmitted, at least one of a transmission operation on the transmission side and a reception operation on the reception side is stopped or set into a stand-by state. Also, preferably, a transmission bandwidth of a transmission path is reduced, or a transmission bandwidths for signals, except for a signal not to be transmitted or received, are expanded without changing the transmission bandwidth of the transmission path.

When one of a transmission signal and a reception signal is selectively switched on one side of bi-directional transmission system, upon switching from a reception signal to a transmission signal, a switching operation from the reception signal to the transmission signal is performed at least during a non-signal period of the transmission signal and then a control is performed to stop a reception operation. Conversely, upon switching from a transmission signal to a reception signal, after a reception operation is started and properly performed, a switching operation from the transmission signal to the reception signal is performed at least during a non-signal period of the reception signal.

As a result, since the operation of a signal processing circuit portion associated with a signal not required to be transmitted, a signal determined to be unusual, and so on and the transmission of these signals are stopped or set into a stand-by state, power consumption can be reduced. Also, when the transmission bandwidth of the transmission path is reduced in addition to the stoppage or stand-by of the transmission, a circuit configuration associated with the transmission path is simplified, and an operation speed becomes lower, so that the power consumption can be further reduced.

Further, when the transmission bandwidths for the signals except for the signal not to be transmitted or received are expanded in addition to the above features, the signal which requires the highest quality (for example, video signals) can be transmitted with an improved quality.

Furthermore, even if a transmission signal and a reception signal are selectively switched and a reception operation is stopped when the reception signal is not selected, the signal switching operation is performed during a non-signal period of the signal, so that the reception signal can be received from the start to the end of a signal period without any interruption, whereby the signal and the synchronization thereof will not be disturbed, and a properly switched signal can be provided.

BRIEF DESCRIPTION OF THE DRAWINGS

FIG. 3 shows timing charts (a)–(e) for explaining multiplexed transmission and reception signals to which an embodiment of the present invention is applied;

FIG. 4 is a block diagram illustrating the configuration of a camera system to which one embodiment of the present invention is applied;

FIG. 5 shows timing charts (a)–(d) for explaining how a video signal to a view finder is switched from one to another in a conventional method and apparatus for transmitting multiplexed video signals;

FIG. 11 shows timing charts (a)–(h) illustrating waveforms of signals at respective points in the embodiment of FIG. 6 for explaining how a video signal to a view finder is switched.

DESCRIPTION OF THE PREFERRED EMBODIMENTS

One embodiment of a video signal transmission control method and apparatus according to the present invention will hereinafter be described with reference to the accompanying drawings. This embodiment describes an example in which the present invention is applied to a camera system illustrated in FIG. 4, wherein multiplexed signals are bi-directionally transmitted between a camera 1 and a CCU 2 through a transmission path 3 which serves as a transmission means. It is assumed in this embodiment that the transmission means consists of the transmission path 3 having a single line through which transmission signals and reception signals as illustrated in (a)–(e) of FIG. 3 are transmitted from their sources and received by their destinations.

It should be noted that the present invention is not limited to a bi-directional transmission of time-base-multiplexed transmission signals and reception signals as illustrated in (a)–(e) of FIG. 3 through a single transmission path, as will be described later, but may also be applied to a bi-directional transmission of transmission signals and reception signals multiplexed according to another scheme. It should be further noted that the present invention may also be applied to the case where two transmission paths are used to separately transmit transmission signals and reception signals through respective transmission paths. The configuration for bi-directionally transmitting transmission and reception signals as illustrated in (a)–(e) of FIG. 3 between a camera and a CCU through a signal transmission path in a time-base multiplex scheme is disclosed in the aforementioned U.S. Ser. No. 08/361,724 and EP Patent Application No. 94309860.8.

Figure 1:
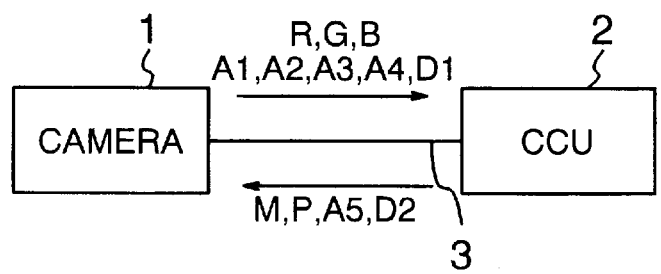
FIG. 1 is a block diagram for explaining flows of multiplexed transmission signals transmitted between a camera and a CCU, to which an example of the present invention is applied.
Figure 2:
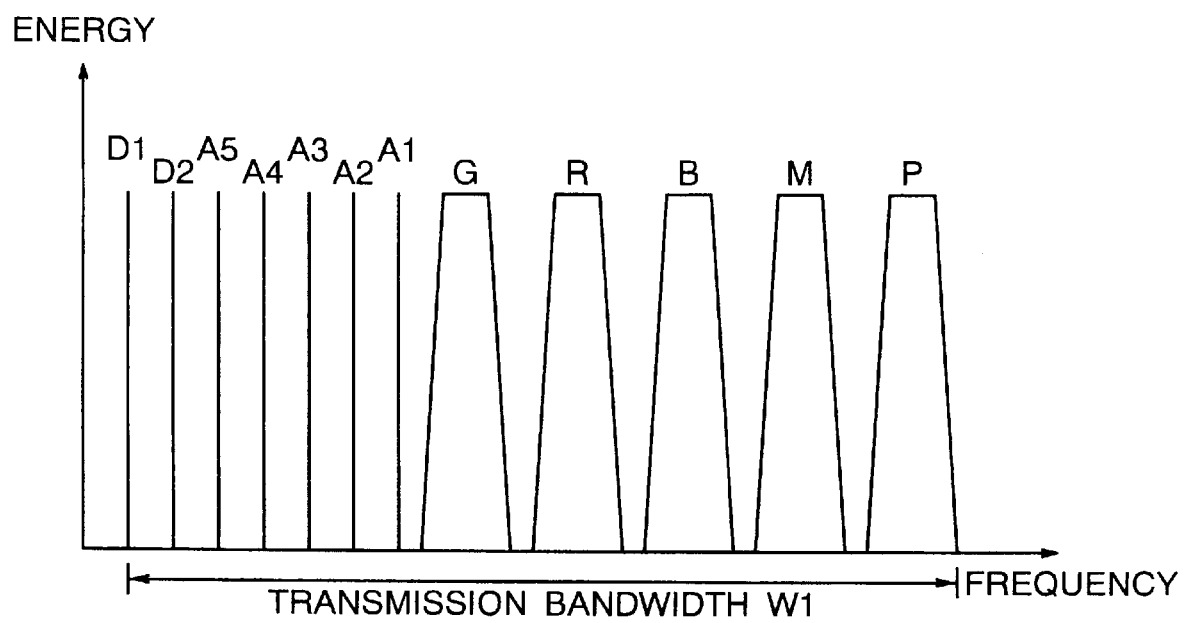
FIG. 2 is a graph illustrating the frequency spectrum of conventional video signals processed by a conventional method and apparatus for transmitting multiplexed video signals.
Figure 6:
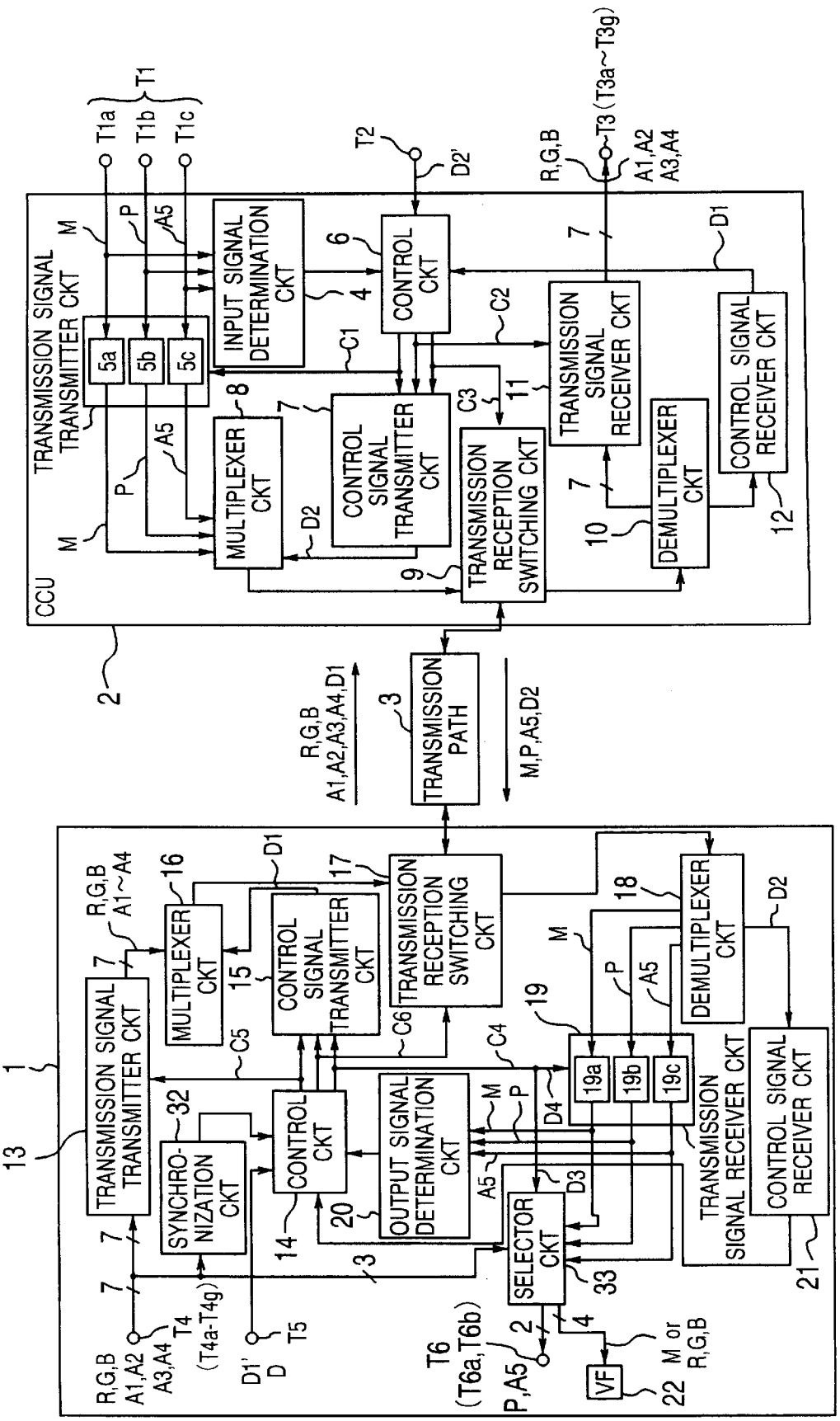
FIG. 6 is a block diagram illustrating the configuration of one embodiment of a video signal transmission control method and apparatus according to the present invention.

FIG. 6 is a block diagram illustrating the configuration of a system according to this embodiment. Signals transmitted and received in the system includes video signals R, G, B for broadcasting; audio signals A1, A2, A3, A4 for broadcasting; a control signal D1 for controlling a CCU, later described; a return video signal M for monitoring; a prompt video signal P for displaying a text; an audio signal A5 for giving instructions to a camera man 26; a control signal D2 for controlling a camera, later described; and a control signal D supplied from an intercom 25 of the camera man 26 to a camera 1 for setting which of the return video signal M and the video signals R, G, B is selected as a VF video signal.

The system illustrated in FIG. 6 is mainly composed of the camera 1, the CCU 2 and a transmission path (cable).

First, the configuration of the CCU 2 will be explained. In the CCU 2, the return signal M from a switcher 31, the prompt video signal P from a text generator unit 28, and the audio signal A5 from an intercom 25 of a director are inputted through input terminals T1a, T1b, T1c, respectively. An input terminal T2 is a terminal for inputting a control signal D2' to the CCU 2. The control signal D2' may be transmitted from the switcher 31 or may be set on a manipulation panel of the CCU 2. An output terminal T3 is a terminal for outputting the video signals R, G, B and the audio signals A1–A4 to the switcher 31.

The CCU 2 comprises an input signal determination circuit 4 for determining whether the return video signal M, the prompt video signal P and the audio signal A5 from the input terminals T1a–T1c are normal or not; and a transmission signal transmitter circuit 5 having transmitter circuit sections 5a, 5b, 5c, each of which performs bandwidth limitation and data compression on associated one of the return video signal M, the prompt video signal P and the audio signal A5, as required, and thereafter modulates the processed signal to a transmittable signal. The respective transmitter circuit sections 5a, 5b, 5c are configured such that a control circuit 6, later described, can selectively stop or set into a stand-by state their respective processing operations.

The control circuit 6 is dedicated to stop the operation of the transmission signal transmitter circuit 5; control the transmission bandwidth adjusted by a transmission/reception switching circuit 9, later described; and control the processing such as bandwidth limitation, data compression, and so on performed in a transmission signal receiver circuit 11, later described. A control signal transmitter circuit 7 modulates a control signal D2 generated in the control circuit 6 to a transmittable signal. A multiplexer circuit 8 multiplexes signals generated by the transmission signal transmitter circuit 5 and the control signal transmitter circuit 7 such that these signals can be transmitted through the single transmission path 3. As a result, the multiplexer circuit 8 generates an output signal as illustrated in (c) of FIG. 3.

The transmission/reception switching circuit 9 receives signals transmitted from the camera 1 to the CCU 2 through the transmission path 3, transmits signals to be sent from the CCU 2 to the camera 1 through the transmission path 3, and can adjust the transmission bandwidth in response to a control signal from the control circuit 6.

More specifically, a signal from the multiplexer circuit 8 ((c) of FIG. 3) is time-base-compressed by the transmission/reception switching circuit 9 to be converted into a signal as illustrated in (e) of FIG. 3), which is transmitted onto the transmission path 3. During a non-signal period t1 in the signal of (e) of FIG. 3, a transmission signal from the camera 1 ((d) of FIG. 3) is received by the transmission/reception switching circuit 9. Thus, the signals on the transmission path 3, transmitted from the CCU 2 and the camera 1, are arranged as illustrated in (b) of FIG. 3.

On the other hand, the multiplexed signal including the signals B, G, R, A1–A4, D1 ((d) of FIG. 3), transmitted from the camera 1 through the transmission path 3, are time-base-expanded by the transmission/reception switching circuit 9 to be recovered as illustrated in (a) of FIG. 3. As illustrated in FIG. 6, the signals M, P, A5 are transferred on separate lines from the terminal T1 to the transmission signal transmitter circuit 5 and the input signal determination circuit 4 and from the transmission signal transmitter circuit 5 to the multiplexer circuit 8, respectively.

A demultiplexer circuit 10 demultiplexes the multiplexed signal including the signals R, G, B, A1–A4, D1 transmitted from the camera 1 and received by the transmission/reception switching circuit 9 through the transmission path 3. The transmission signal receiver circuit 11 performs data expansion and demodulation on signals demultiplexed by the demultiplexer circuit 10 to recover the video signals R, G, B and the audio signals A1, A2, A3, A4 prior to the transmission. In addition, the receiver circuit 11 is capable of changing a data expansion ratio and a demodulation ratio in response to a control signal C2 from the control circuit 6. A control signal receiver circuit 12 demodulates the signal D1 demultiplexed by the demultiplexer circuit 10 to the control signal D1 prior to the transmission.

The respective signals R, G, B, A1, A2, A3, A4 demultiplexed by the demultiplexer circuit 10 are transferred to the transmission signal receiver circuit 11 on separate lines, and the signals R, G, B, A1, A2, A3, A4 from the receiver circuit 11 are delivered to separate terminals T3 (T3a, T3b, T3c, T3d, T3e, T3f, T3g), respectively.

Next, the configuration of the camera 1 will be explained referring again to FIG. 6. In the camera 1, video signals R, G, B and audio signals A1–A4 from a video/audio processing circuit, not shown, of the camera 1 are inputted to input terminals T4 (Ta1–Ta4), respectively. A control signal D and a control signal D1 from an intercom 25 of the camera man 26 are inputted to input terminals T5. Alternatively, the control signal D1 may be inputted from a manipulation panel (not shown) of the camera 1 by the camera man 26 manipulating the manipulation panel. Within the output signals B, G, R, M, P, A5 from a selector circuit 33, the prompt video signal P outputted from an output terminal T6 (T6a) is supplied to a prompter 24, while the audio signal A5 outputted from an output terminal T6b is supplied to the intercom 25 of the camera man 26. Further, the return video signal M or the video signal B, G, R are supplied to a view finder 22.

The camera 1 further comprises a transmission signal transmitter circuit 13 which performs bandwidth limitation, data compression on the video signals R, G, B and the audio signals A1, A2, A3, A4 from the input terminals T4, as required, and thereafter modulates the processed signals to transmittable signals. In addition, the transmitter circuit 13 is capable of changing the bandwidth limitation, a data compression ratio and a demodulation ratio in response to a control signal from a control circuit 14. The controller 14 is dedicated to stop the operation of a transmission signal receiver circuit 19, later described; control the transmission bandwidth adjusted by a transmission/ reception switching circuit 17, later described; and control the processing such as bandwidth limitation, data compression, and so on for a transmission signal transmitter circuit 13. The control circuit 14 also generates a control signal D3, based on the control signal D and a synchronization signal detected by a synchronization detector circuit 32, later described, for selecting the return video signal M or the video signals R, G, B as a VF video signal, and outputs the control signal D3 to the selector circuit 33, later described. A control signal transmitter circuit 15 modulates the control signal D1 generated by the control signal 14 to a transmittable signal. A multiplexer circuit 16 multiplexes the signals R, G, B, A1–A4 generated by the transmission signal transmitter circuit 13 and the signal D1 generated by the control signal transmitter circuit 15 such that these signals can be transmitted through the single transmission path 3. As a result, the multiplexer circuit 16 generates an output signal as illustrated in (a) FIG. 3. A transmission/reception switching circuit 17 transmits signals to be transmitted from the camera 1 to the CCU 2 through the transmission path 3 and receives signals transmitted from the CCU 2 to the camera 1 through the transmission path 3. The switching circuit 17 is capable of adjusting the transmission bandwidth in response to a control signal from the control circuit 14. More specifically, the signal ((a) of FIG. 3) from the multiplexer circuit 16 is time-base-compressed to be converted into a signal as illustrated in (b) of FIG. 3 and sent onto the transmission path 3 by the transmission/reception switching circuit 17. During a non-signal period t2 in the signal of (b) of FIG. 3, transmission signals from the CCU 2 ((e) of FIG. 3) is received by the transmission/reception switching circuit 17.

On the other hand, the multiplexed signal including the signals M, P, A5, D2 ((e) of FIG. 3), transmitted from the CCU 2 through the transmission path 3, are time-base-expanded by the transmission/reception switching circuit 17 to be recovered as illustrated in (c) of FIG. 3.

A demultiplexer circuit 18 demultiplexes a multiplexed signal transmitted from the CCU 2 and received by the transmission/reception switching circuit 17 through the transmission path 3 and outputs demultiplexed signals to separate lines, respectively. A transmission signal receiver circuit 19 comprises receiver circuit sections 19a, 19b, 19c, each of which performs data expansion and demodulation on associated one of the signals M, P, A5 demultiplexed by the demultiplexer circuit 18 so as to recover the return video signal M, the prompt video signal P or the audio signal A5 prior to the transmission. These receiver circuit sections 19a, 19b, 19c are configured such that their respective processing operations can be selectively stopped or set into a stand-by state in response to a control signal C4 from the control circuit 14. An output signal determination circuit 20 determines whether the return video signal M, the prompt video signal P, and the audio signal A5 demodulated by the transmission signal receiver circuit 19 are normal or not. A control signal receiver circuit 21 demodulates the control signal D2 demultiplexed by the demultiplexer circuit 18 to the signal D2 prior to the transmission. A synchronization detector circuit 32 extracts synchronization signals from the video signals R, G, B. The selector circuit 33 selects one from a set of the video signals R, G, B and the return video signal M in response to a control signal D3 from the control circuit 14 and outputs the selected signal, for example, as a video signal for the view finder 22.

In the camera 1, the signals R, G, B, A1, A2, A3, A4 respectively inputted to the input terminals T4a–T4g are transferred to the transmission signal transmitter circuit 13 through corresponding separate lines (a total of seven lines), and the signals R, G, B, A1, A2, A3, A4 from the transmitter circuit 13 are transferred to the multiplexer circuit 16 through corresponding separate lines. The signal R, G, B respectively inputted to the input terminals T4a–T4c are transferred to the synchronization circuit 32 and the selector circuit 33 through corresponding separate lines (a total of three lines). The signals P, A5 from the selector circuit 33 are transferred to the output terminals T6a, T6b through corresponding separate lines. The signals R, G, B, M from the selector circuit 33 are supplied to the view finder 22 through corresponding separate lines.

Figure 7:
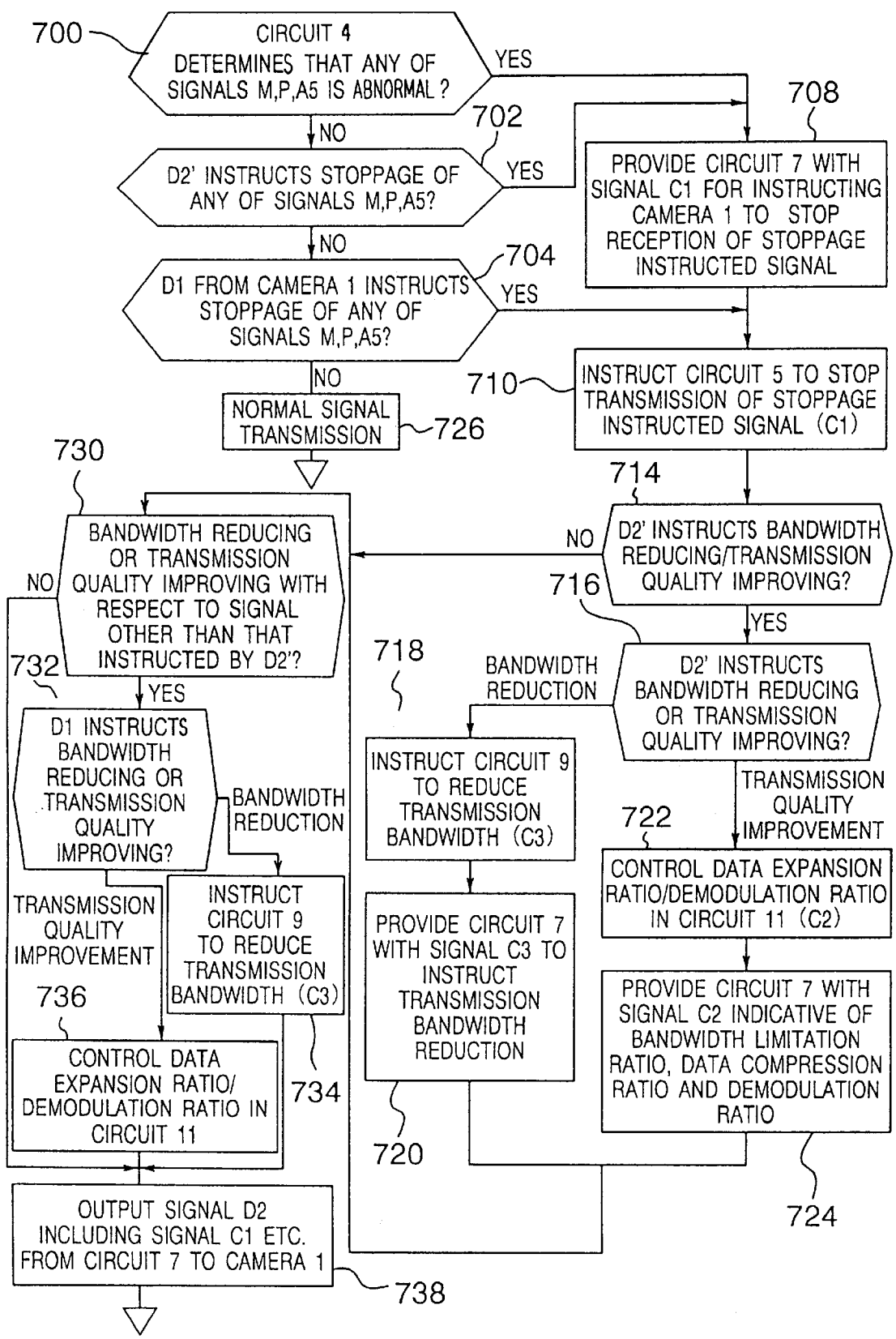
FIG. 7 is a flow chart for explaining the operation of a CCU in the embodiment illustrated in FIG. 6.
Figure 8:
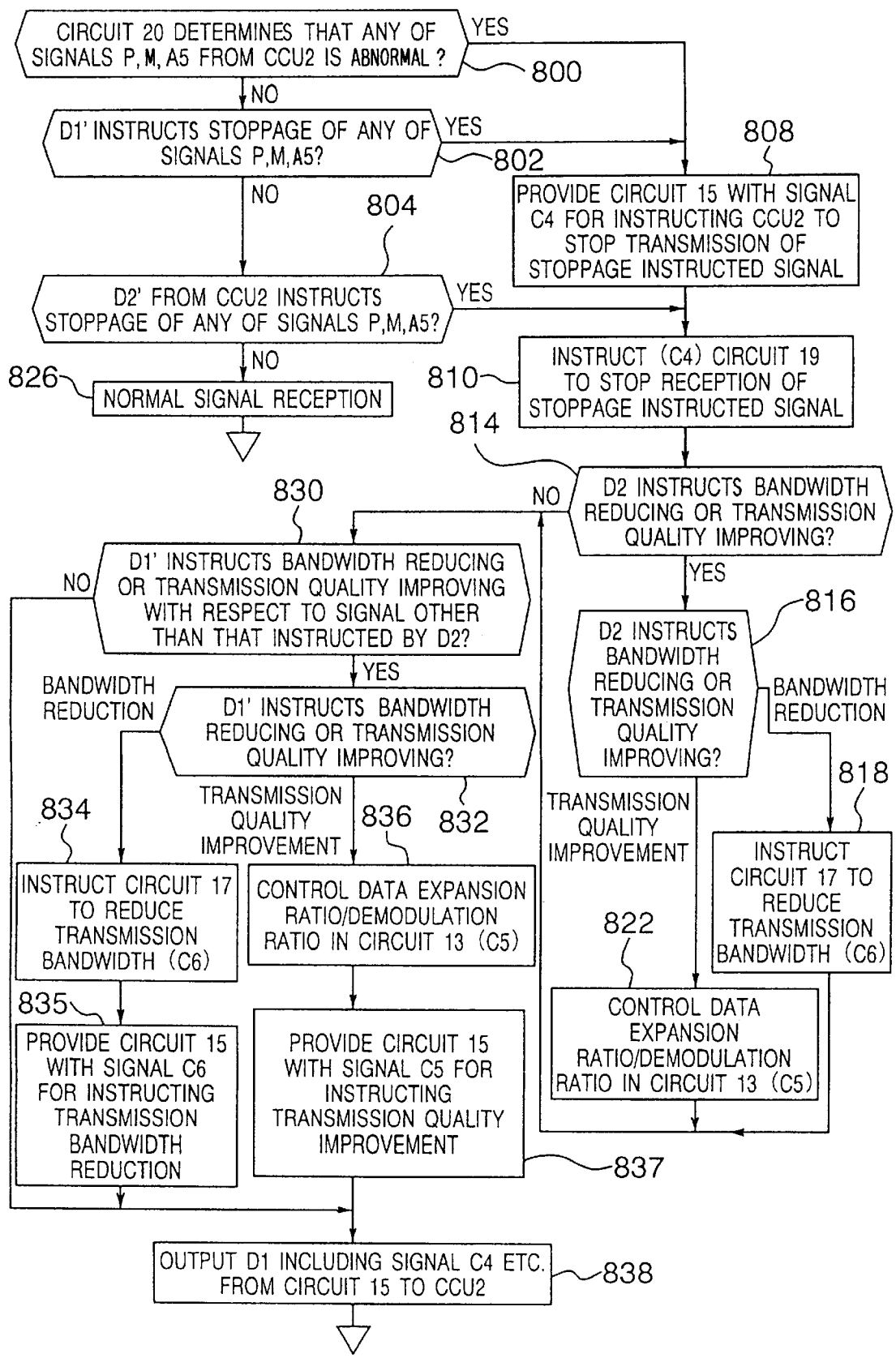
FIG. 8 is a flow chart for explaining the operation of a camera in the embodiment illustrated in FIG. 6.

Next, the operation of the camera system configured as illustrated in FIG. 6 will be explained with reference to flow charts of FIGS. 7, 8. FIG. 7 illustrates a flow chart for explaining a sequence of operations performed by the control circuit 6 in the CCU 2 in the embodiment of FIG. 6, while FIG. 8 illustrates a flow chart for explaining a sequence of operations performed by the control circuit 14 in the camera 1 in the embodiment of FIG. 6. It should be noted that the sequences illustrated in FIGS. 7, 8 are executed every predetermined time, for example, every field period of a video signal.

First, the sequence of operations performed by the CCU 2 will be explained. On the CCU 2 side, (1) if the input signal determination circuit 4 determines that at least one of the prompt video signal P, the return video signal M and the audio signal A5 is faulty or has not been normally inputted; (2) if the control signal D2' includes a signal inputted from the outside instruction to stop at least one of the above signals P, M, A5; or (3) if the control signal receiver circuit 12 receives the signal D1 from the camera 1 side informing that the transmission of at least one of the above signals P, M, A5 has been stopped, the control circuit 6 stops or sets into a stand-by state the transmission of the transmission signal transmitter circuit 5 corresponding to a signal associated with one of the above-mentioned three cases (1)–(3). Further, in the cases (1), (2), the control circuit 6 transmits a signal D2 for informing the camera 1 that the transmission has been stopped through the control signal transmitter circuit 7.

Figure 9:
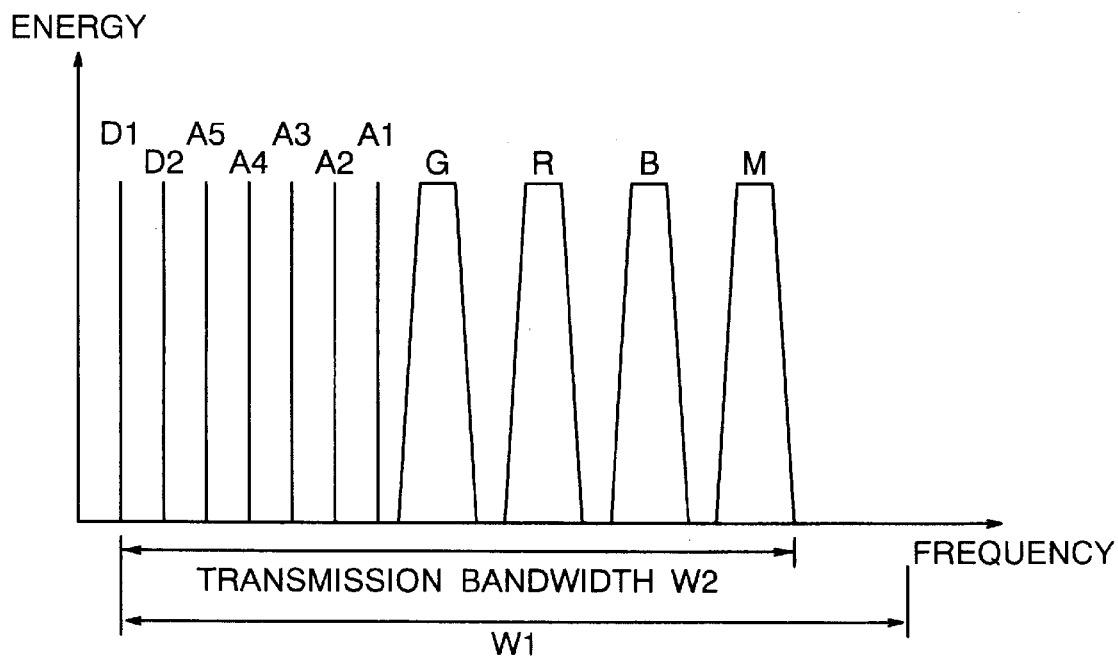
FIG. 9 is a graph illustrating the frequency spectrum of transmission signals when a transmission bandwidth is reduced in the embodiment of FIG. 6.

Additionally, in the cases (2), (3), when the control signal D1 or D2' includes an instruction "to set the transmission into a mode in which signals are always transmitted through the transmission path 3 of a narrowest possible transmission bandwidth", the control circuit 6 controls the transmission/reception switching circuit 9 so as to provide the transmission path 3 with a transmission bandwidth which allows for the transmission of all signals except for a signal which is not processed in the transmission signal transmitter circuit 5 (for example, if the transmission of the prompt video signal P has been stopped, the bandwidth for the remaining signals is indicated by a transmission bandwidth W2 in FIG. 9). Further, in the case (2), the control circuit 6 sends a signal D2 for informing the camera 1 of a reduced width of the transmission band of the transmission path 3 through the control signal transmitter circuit 7. In this case, the transmission bandwidths W1, W2 has a relationship W1>W2.

Figure 10:
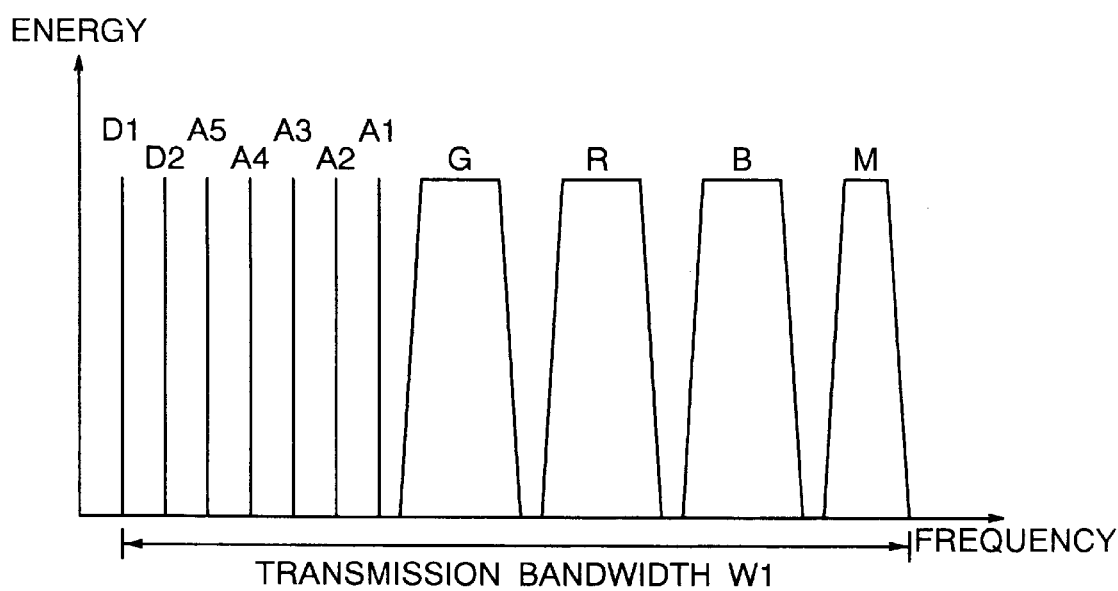
FIG. 10 is a graph illustrating the frequency spectrum of transmission signals when a transmission quality is improved in the embodiment of FIG. 6.

Further, in the cases (2), (3), if the control signal D1 or D2, includes an instruction "to set a mode in which a transmission quality is improved for any of the video signals R, G, B and the audio signals A1–A4", the control circuit 6 instructs the transmission signal receiver circuit 11 to change a bandwidth limitation ratio, a data expansion ratio and a demodulation ratio for the signal subjected to the quality improvement mode, such that a transmission bandwidth associated with the signal subjected to the quality improvement mode is expended by a predetermined bandwidth (for example, the transmission bandwidth associated with the signal which is not processed in the transmission signal transmitter circuit 5). Also, in the case (2), the control circuit 6 sends a signal D2 for informing the camera 1 of the changed bandwidth limitation ratio, data expansion ratio and demodulation ratio through the control signal transmitter circuit 7. For example, if the processing of the prompt video signal P is stopped and the transmission quality of the video signals R, G, B are improved by the portion of the prompt video signal P, the transmission bandwidths for the video signals R, G, B are expanded within the entire transmission bandwidth W1 as illustrated in FIG. 10. It should be noted that the transmission bandwidth W1 is intended to bi-directionally transmit a multiplexed signal having all the signals R, G, B, A1, A2, A3, A4, A5, M, P, D1, D2 through the transmission path 3, as described above.

Next, the sequence of operations performed by the CCU 2 as described above will be explained in detail with reference to the flow chart of FIG. 7.

First, it is determined in the input signal determination circuit 4 whether or not any of signals M, P, A5 inputted from the terminals T1 (T1a–T1c) is unusual (i.e., transmission disabled or transmission not required state), and the determination result is notified to the control circuit 6 (step 700). It is when any of these input signals M, P, A5 is not inputted, when the signal, although inputted, presents disturbed synchronization, and so on, that any of these input signals M, P, A5 is determined to be unusual. If it is determined at step 700 that any of the signals M, P, A5 is unusual and the determination result is notified to the control circuit 6, the processing proceeds to step 708.

At step 708, the control circuit 6 supplies the control signal transmitter circuit 15 with a signal C1 for instructing the camera 1 to stop the reception of a signal which has been determined to be unusual.

The processing proceeds to step 702 irrespective of the determination result at step 700. At step 702, the control circuit 6 determines whether a control signal D2' inputted to the terminal T2 instructs the CCU 2 to stop the transmission of any of the signals M, P, A5 (i.e., set into a transmission not required state). If the control circuit 6 determines at step 702 that the control signal D2' instructs the CCU 2 to stop the transmission of any of the signals M, P, A5, the control circuit 6 supplies, at step 708, the control signal transmitter circuit 7 with a signal C1 for instructing the camera 1 to stop the reception of the signal, the transmission of which has been instructed to be stopped.

The processing next proceeds to step 704 irrespective of the determination result at step 702.

At step 704, it is determined whether a multiplexed signal from the camera 1 includes a control signal D1 and which of the signals M, P, A5 the control signal D1 instructs the CCU 2 to stop if the control signal D1 is included. More specifically, if the multiplexed signal transmitted from the camera 1 through the transmission path 3 includes a control signal D1, the control signal D1 is demultiplexed by the demultiplexer circuit 10 from other signals, received by the control signal receiver circuit 12, demodulated by the receiver circuit 12, and supplied to the control circuit 6. Then, the control circuit 6 determines whether the control signal D1 instructs the CCU 2 to stop the transmission of any of the signals M, P, A5. When the determination results at steps 700, 702, 704 are all NO, the processing proceeds to step 726, where a normal transmission is performed without stopping the transmission of any of the signals M, P, A5.

Conversely, if any of the determination results at steps 700, 702, 704 is YES, the processing proceeds to step 710. At step 710, the control circuit 6 provides the transmission signal transmitter circuit 5 with a signal Cl for instructing the transmitter circuit 5 to stop the transmission of the signal, the transmission of which has been instructed to be stopped at step 700, 702 or 704.

The transmission signal transmitter circuit 5, in response to the signal C1, stops or sets into a stand-by state the operation of a transmitter circuit section (5a, 5b or 5c) corresponding to the signal, the transmission of which has been instructed to be stopped. If the signal C1 instructs the transmission signal transmitter circuit 5 to stop the transmission of a plurality of different signals in accordance with the determination result at step 700, 702 or 704, the transmission signal transmitter circuit 5, in response to the signal C1, stops or sets into a stand-by state the operations of a plurality of transmitter circuit sections associated with these signals. The stoppage of the operation of a transmitter circuit section involves powering off the transmitter circuit section and hence stopping the supply of clocks to the transmitter circuit section. The stand-by state, on the other hand, refers to stopping the supply of clocks to the transmitter circuit section, and therefore the transmitter circuit section is immediately returned to an operative state when clocks are again inputted thereto. By thus stopping or setting into a stand-by state the operation of the transmitter circuit sections, electric power consumed by the transmission signal transmitter circuit 5 can be reduced.

Next, at step 714, it is determined whether the control signal D2' includes an instruction "to set the transmission into a mode in which signals are always transmitted through the transmission path 3 of the narrowest transmission bandwidth" (i.e., instruction to reduce the bandwidth), or an instruction "to improve the transmission quality of one or more of the video signals R, G, B and the audio signals A1, A2, A3, A4" (i.e., an instruction to improve the quality). If the control signal D2' does not include either of the instructions, the processing proceeds to step 730.

If it is determined at step 714 that the control signal D2' includes either the bandwidth reducing instruction or the quality improving instruction, the processing proceeds to step 716.

At step 716, if it is recognized that step 714 determines that the bandwidth reducing instruction is included in the control signal D2' the processing proceeds to step 718, whereas if the signal quality improving instruction is included, the processing proceeds to step 722.

At step 718, the control circuit 6 supplies a control signal C3 to the transmission/reception switching circuit 9 in order to reduce an available transmission bandwidth of the transmission path 3 to a bandwidth for all the signals except for the signal, the transmission of which has been stopped in the transmitter circuit 5 at step 710, thereby controlling the transmission bandwidth adjusted by the transmission/reception switching circuit 9. In other words, the transmission bandwidth adjusted by the transmission/reception switching circuit 9 is reduced by a bandwidth portion assigned to the signal, the transmission of which has been stopped. To give a specific example, when the transmission of the prompt video signal P, for example, is stopped, the entire bandwidth for signals (R, G, B, A1–A5, D1, D2, M) transmitted through the transmission path 3 is reduced by a bandwidth for the prompt video signal P, i.e., from a bandwidth W1 to a bandwidth W2 (see FIG. 9). To give another specific example, if the transmission of the prompt video signal P and the return video signal M is stopped, the entire bandwidth for the remaining signals transmitted through the transmission path 3 is reduced by a total of bandwidths for the prompt video signal P and the return video signal M.

Further, at step 720, the control circuit 6 provides the control signal transmitter circuit 7 with a signal C3 for instructing the camera 1 to reduce the transmission bandwidth of the transmission path 3. In this way, when the transmission bandwidth of the transmission path 3 is reduced, electric power consumed by the transmission system can be reduced, and a transmittable distance of signals on the transmission path 3 can be extended. Subsequently, when the operation at step 720 has been completed, the processing proceeds to step 730.

At step 716, if it is recognized that step 714 determines that the control signal D2' includes the quality improving instruction, the processing proceeds to step 722. At step 722, the control signal 6 provides the transmission signal receiver circuit 11 with a control signal C2 for instructing the receiver circuit 11 to change a bandwidth limitation ratio, a data expansion ratio and a demodulation ratio for a signal subjected to the transmission quality improving instruction (any of the video signals R, G, B and the audio signals A1, A2, A3, A4, for example, all of the video signals R, G B), so as to expand the transmission bandwidth for the signal subjected to the transmission quality improving instruction by a predetermined bandwidth. Here, the predetermined bandwidth may be the transmission bandwidth for a signal, the transmission of which has been stopped in the transmitter circuit 5 in accordance with step 710. In this way, the transmission signal receiver circuit 11 controls the bandwidth limitation ratio, the data expansion ratio and the demodulation ratio for the signal subjected to the transmission quality improving instruction. To give a specific example, assuming that the transmission of the prompt video signal P is stopped and the transmission quality is improved for the video signals R, G, B, if the total bandwidths for the respective video signals R, G, B are expanded by a portion of the transmission bandwidth otherwise assigned to the prompt video signal P, the bandwidths for the respective video signals R, G, B are expanded as illustrated in FIG. 10, so that the entire bandwidth for all the signals remains to be W1 (see FIG. 10). In another example, if the transmission of the prompt video signal P and the return video signal M is stopped, the total bandwidths for the respective video signals R, G, B may be expanded by a total of transmission bandwidths for the prompt video signal P and the return video signal M.

Further, at step 724, the control circuit 6 provides the control signal transmitter circuit 7 with a signal C2 for instructing the camera 1 to improve the transmission quality of the signal. Subsequently, when the operation at step 724 has been completed, the processing proceeds to step 730.

Next, it is determined at step 730 whether the control signal D1 transmitted from the camera 1 includes an instruction "to set the transmission into a mode in which signals are always transmitted through the transmission path 3 of the narrowest transmission bandwidth" (i.e., instruction to reduce the bandwidth), or an instruction "to improve the transmission quality of one or more of the video signals R, G, B and the audio signals A1, A2, A3, A4" (i.e., an instruction to improve the quality) with respect to a signal other than that for which such instructions have been included in the control signal D2'. If it is determined that the control signal D1 does not include either the bandwidth reducing instruction or the quality improving instruction, or that the instruction included in the control signal D1 is directed to the same signal processed by the instruction included in the control signal D2', the processing proceeds to step 738. If the control signal D1 includes either the bandwidth reducing instruction or the quality improving instruction, and if the instruction included in the control signal D1 is directed to a signal different from the signal processed by the instruction included in the control signal D2', the processing proceeds to step 732.

If it is recognized at step 732 that step 730 determines that the bandwidth reducing instruction is included in the control signal D1, the processing proceeds to step 734, whereas if the signal quality improving instruction is included, the processing proceeds to step 736.

At step 734, similarly to step 718, the control circuit 6 supplies a control signal C3 to the transmission/reception switching circuit 9 in order to reduce an available transmission bandwidth of the transmission path 3 to a bandwidth for all the signals except for the signal, the transmission of which has been stopped in the transmitter circuit 5 at step 710, thereby reducing the transmission bandwidth adjusted by the transmission/reception switching circuit 9 by the bandwidth portion for the signal, the transmission of which has been stopped. After the operation at step 734 has been completed, the processing proceeds to step 738.

On the other hand, if it is determined at step 732 that step 730 determines that the control signal D1 includes the quality improving instruction, the processing proceeds to step 736. At step 736, similarly to step 722, the control signal 6 provides the transmission signal receiver circuit 11 with a control signal C2 for instructing the receiver circuit 11 to change a bandwidth limitation ratio, a data expansion ratio and a demodulation ratio for a signal subjected to the transmission quality improving instruction (any of the video signals R, G, B and the audio signals A1, A2, A3, A4), so as to expand the transmission bandwidth for the signal subjected to the transmission quality improving instruction by a predetermined bandwidth. After the operation at step 734 has been completed, the processing proceeds to step 738.

At step 738, the control signal transmitter circuit 7 adds the control signal C1 and so on provided to the control signal transmitter circuit 7 at steps 708, 720, 724 to the control signal D2 and supplies them to the multiplexer circuit 8. Then, the multiplexer circuit 8 multiplexes a transmission signal from the transmission signal transmitter circuit 5 with the control signal D2, and transmits the multiplexed signal onto the transmission path 3 through the transmission/reception switching circuit 9. Thereafter, the processing illustrated in FIG. 7 is terminated.

Next, the operation of the camera 1 will be explained. On the camera 1 side, (4) if the output signal determination circuit 20 determines that at least one of a prompt video signal P, a return video signal M and an audio signal AS sent from the CCU 2 is faulty or has not been normally transmitted; (5) if the control signal D1' includes a signal inputted from the outside instructing to stop at least one of the above signals P, M, AS; or (6) if the control signal receiver circuit 21 has received a signal D2 which informs that the transmission of at least one of the above signals P, M, A5 has been stopped in the CCU 2, the control circuit 14 stops or sets into a stand-by state the operation of a receiver circuit section 19a–19c in the transmission signal receiver circuit 19 associated with the signal which has been stopped or set into a stand-by state. Further, in the cases (4), (5), the control circuit 14 transmits to the CCU 2 a signal D1 for informing the CCU 2 that the reception of the signal has been stopped through the control signal transmitter circuit 15.

Further, in the case (6), if the control signal receiver circuit 21 has received a control signal D2 including a signal C2 "indicating that the transmission has been set into a mode in which signals are always transmitted through the transmission path 3 of the narrowest transmission bandwidth in the CCU 2", the control circuit 14 controls the transmission bandwidth adjusted by the transmission/reception switching circuit 17 to be the same as the transmission bandwidth adjusted by the transmission/reception switching circuit 9 on the CCU 2 side in accordance with the control signal C3 indicative of the transmission bandwidth of the transmission path 3.

Also, in the case (6), if the control signal receiver circuit 21 has received a control signal D2 including a signal C2 "indicating that the transmission has been set into a mode in which the signal quality is improved for any of the video signals R, G, B and the audio signals A1, A2, A3, A4 in the CCU 2", the control circuit 14 controls the transmission signal transmitter circuit 13 to set a bandwidth limitation ratio, a data compression ratio and a modulation ratio to the same values as those determined in the CCU2 in accordance with the signal C2 indicative of the bandwidth limitation ratio, the data compression ratio and the modulation ratio set by the transmission signal receiver circuit 11 on the CCU 2 side.

Next, the operation in the camera 1 as described above will be explained in detail with reference to the flow chart of FIG. 8.

First, it is determined in the input signal determination circuit 20 whether or not any of signals M, P, A5 transmitted from the CCU 2 and received by the transmission signal receiver circuit 19 through the transmission path 3, the transmission/reception switching circuit 17 and the demultiplexer circuit 18 is unusual, and the determination result is notified to the control circuit 14 (step 800). If it is determined at step 800 that any of the signals M, P, A5 is unusual (reception disabled or reception impossible state) and the determination result is notified to the control circuit 14, the processing proceeds to step 808.

At step 808, the control circuit 14 provides the control signal transmitter circuit 15 with a signal C4 for instructing the CCU 2 to stop the transmission of the signal which has been determined to be unusual.

The processing proceeds to step 802 irrespective of the determination result at step 800. At step 802, the control circuit 14 determines whether a control signal D1' inputted to the terminal T5 instructs the camera 1 to stop the reception of any of the signals M, P, A5 (i.e., set any of the signals into a reception not required state). If the control circuit 14 determines at step 802 that the control signal D1' instructs the camera 1 to stop the reception of any of the signals M, P, A5, the control circuit 14 supplies, at step 808, the control signal transmitter circuit 15 with a signal C4 for instructing the CCU 2 to stop the transmission of the signal, the reception of which has been instructed to be stopped.

The processing next proceeds to step 804 irrespective of the determination result at step 802.

At step 804, it is determined whether a multiplexed signal from the CCU 2 includes a control signal D2 and whether the control signal D2, if included in the multiplexed signal, instructs the camera 1 to stop any of the signals M, P, A5. More specifically, if the multiplexed signal transmitted from the CCU 2 through the transmission path 3 includes the control signal D2, the control signal D2 is demultiplexed by the demultiplexer circuit 18 from other signals, received by the control signal receiver circuit 21, demodulated by the receiver circuit 21, and supplied to the control circuit 14. Then, the control circuit 14 determines whether the control signal D2 instructs the camera 1 to stop the reception of any of the signals M, P, A5. When the determination results at steps 800, 802, 804 are all NO, the processing proceeds to step 826, where a normal signal reception is performed without stopping the reception of any of the signals M, P, A5.

Conversely, if any of the determination results at steps 800, 802, 804 is YES, the processing proceeds to step 810. At step 810, the control circuit 14 provides the transmission signal receiver circuit 19 with a signal C4 for instructing the receiver circuit 19 to stop the reception of the signal, the reception of which has been instructed to be stopped at step 800, 802 or 804. The transmission signal receiver circuit 19, in response to the signal C4, stops or sets into a stand-by state the operation of a receiver circuit section (19a, 19b or 19c) corresponding to the signal, the reception of which has been instructed to be stopped. If the signal C4 instructs the transmission signal receiver circuit 19 to stop the reception of a plurality of different signals in accordance with the determination result at step 800, 802 or 804, the receiver circuit 19, in response to the signal C4, stops or sets into a stand-by state the operations of a plurality of receiver circuit sections corresponding to the plurality of signals. The stoppage of the operation of a receiver circuit section involves powering off the receiver circuit section and hence stopping the supply of clocks to the receiver circuit section. The stand-by state, on the other hand, refers to stopping the supply of clocks to the receiver circuit section, and therefore the receiver circuit section is immediately returned to an operative state when clocks are again inputted. By thus stopping or setting into a stand-by state the operation of the receiver circuit sections, electric power consumed by the transmission signal receiver circuit 19 can be reduced.

Next, at step 814, it is determined whether the control signal D2 transmitted from the CCU 2 includes an instruction "to set the transmission into a mode in which signals are always transmitted through the transmission path 3 of the narrowest transmission bandwidth" (i.e., instruction to reduce the bandwidth), or an instruction "to improve the transmission quality of one or more of the video signals R, G, B and the audio signals A1, A2, A3, A4" (for example, the video signals R, G, B) (i.e., an instruction to improve the quality). If the control signal D2 does not include either the bandwidth reducing instruction or the quality improving instruction, the processing proceeds to step 830. If it is determined at step 814 that the control signal D2 includes either the bandwidth reducing instruction or the quality improving instruction, the processing proceeds to step 816.

At step 816, if it is recognized that step 814 determines that the bandwidth reducing instruction is included in the control signal D2, the processing proceeds to step 818, whereas if the quality improving instruction is included, the processing proceeds to step 822.

At step 818, similarly to step 834, later described, the control circuit 14 supplies a control signal C6 to the transmission/reception switching circuit 17 in order to reduce an available transmission bandwidth of the transmission path 3 to a total of bandwidths for all the signals except for the signal, the reception of which has been stopped in the receiver circuit 19 at step 810, thereby reducing the transmission bandwidth adjusted by the transmission/ reception switching circuit 17 by a bandwidth portion for the signal, the reception of which has been stopped. After the operation at step 818 has been completed, the processing proceeds to step 830.

On the other hand, if it is recognized at step 816 that step 814 determines that the control signal D2 includes the quality improving instruction, the processing proceeds to step 822. At step 822, the control signal 14 provides the transmission signal transmitter circuit 13 with a control signal C5 for instructing the transmitter circuit 13 to change a bandwidth limitation ratio, a data expansion ratio and a demodulation ratio for a signal subject to the transmission quality improving instruction (one or more of the video signals R, G, B and the audio signals A1, A2, A3, A4), so as to expand the transmission bandwidth for the signal subjected to the transmission quality improving instruction, by a predetermined bandwidth, similarly to step 836, later described. After the operation at step 822 has been completed, the processing proceeds to step 830.

Next, it is determined at step 830 whether the control signal D1' from the terminal T5 includes an instruction "to set the transmission into a mode in which signals are always transmitted through the transmission path 3 of the narrowest transmission bandwidth" (i.e., instruction to reduce the bandwidth), or an instruction "to improve the transmission quality of one or more of the video signals R, G, B and the audio signals A1, A2, A3, A4" (i.e., an instruction to improve the quality) with respect to a signal other than that for which such instructions have been included in the control signal D2. If it is determined that the control signal D1' does not include either the bandwidth reducing instruction or the quality improving instruction, or that the instruction included in the control signal D1' is directed to the same signal processed by the instruction included in the control signal D2, the processing proceeds to step 838. If the control signal D1' includes either the bandwidth reducing instruction or the quality improving instruction, and if the instruction included in the control signal D1'is directed to a signal different from the signal processed by the instruction included in the control signal D2, the processing proceeds to step 832.

If it is recognized at step 832 that step 830 determines that the bandwidth reducing instruction is included in the control signal D1', the processing proceeds to step 834, whereas if step 830 determines that the signal quality improving instruction is included, the processing proceeds to step 836. At step 834, the control circuit 14 supplies a control signal C6 to the transmission/reception switching circuit 17 in order to reduce an available transmission bandwidth of the transmission path 3 to an entire bandwidth for all the signals except for the signal, the reception of which has been stopped in the receiver circuit 19 at step 810, thereby controlling the transmission bandwidth adjusted by the transmission/reception switching circuit 17. In other words, the transmission bandwidth adjusted by the transmission/reception switching circuit 17 is reduced by a bandwidth portion for the signal, the transmission of which has been stopped. To give a specific example, when the transmission of the prompt video signal P, for example, is stopped, the entire bandwidth for signals (R, G, B, A1–A5, D1, D2, M) transmitted through the transmission path 3 is reduced by a bandwidth assigned to the prompt video signal P, i.e., from a bandwidth W1 to a bandwidth W2 (see FIG. 9). To give another specific example, if the transmission of the prompt video signal P and the return video signal M is stopped, the entire bandwidth for the remaining signals transmitted through the transmission path 3 is reduced by a total of bandwidths for the prompt video signal P and the return video signal M.

Next, at step 835, the control circuit 14 provides the control signal transmitter circuit 15 with a signal C6 for instructing the camera 1 to reduce the transmission bandwidth.

By thus reducing the transmission bandwidth, electric power consumed by the transmission system can be reduced, and a transmittable distance of signals on the transmission path 3 can be extended. Subsequently, when the operation at step 835 has been completed, the processing proceeds to step 838.

At step 832, if it is recognized that step 830 determines that the control signal D1' includes the quality improving instruction, the processing proceeds to step 836. At step 836, the control signal 14 provides the transmission signal transmitter circuit 13 with a control signal C5 for instructing the transmitter circuit 13 to change a bandwidth limitation ratio, a data expansion ratio and a demodulation ratio for a signal subjected to the transmission quality improving instruction (one or more of the video signals R, G, B and the audio signals A1, A2, A3, A4), so as to expand the transmission bandwidth for the signal subjected to the transmission quality improving instruction by a predetermined bandwidth. Here, the predetermined bandwidth may be the transmission bandwidth for a signal, the reception of which has been stopped in the receiver circuit 19 at step 810. In this way, the transmission signal transmitter circuit 13 controls the bandwidth limitation ratio, the data expansion ratio and the demodulation ratio for the signal subjected to the transmission quality improving instruction. To give a specific example, assuming that the transmission of the prompt video signal P is stopped and the transmission quality is improved for the video signals R, G, B, if the total bandwidths for the respective video signals R, G, B are expanded by a portion of the transmission bandwidth otherwise assigned to the prompt video signal P, the bandwidths for the respective video signals R, G, B are expanded as illustrated in FIG. 10, so that the entire bandwidth for all the signals remains to be W1 (see FIG. 10). In another example, if the transmission of the prompt video signal P and the return video signal M is stopped, the total bandwidths for the respective video signals R, G, B may be expanded by a total of transmission bandwidths for the prompt video signal P and the return video signal M.

Further, at step 837, the control circuit 14 provides the control signal transmitter circuit 15 with a signal C5 for instructing the CCU 2 to improve the transmission quality of the signal.

Thus, after the operation at step 837 has been completed, the processing proceeds to step 838.

At step 838, the control signal transmitter circuit 15 adds the control signal C4 and so on provided to the control signal transmitter circuit 15 at steps 808, 835, 837 to the control signal D1 and supplies them to the multiplexer circuit 16. Then, the multiplexer circuit 16 multiplexes a transmission signal from the transmission signal transmitter circuit 13 with the control signal D1, and transmits the multiplexed signal onto the transmission path 3 through the transmission/reception switching circuit 17. Thereafter, the processing illustrated in FIG. 8 is terminated.

In the foregoing embodiment, while the instructions made by the control signals D2', D2 from the CCU 2 are processed preferentially to the instructions made by the control signals D1', D1 from the camera 1, as described above, the present invention is not limited to this preference order. Alternatively, the instructions made by the control signals D1', D1 from the camera 1 may be processed preferentially to the instructions made by the control signals D2', D2 from the CCU 2.

Also, in the foregoing embodiment, when a reduction of a bandwidth is instructed, the transmission bandwidth adjusted by the transmission/reception switching circuit 9 or 17 is reduced (narrowed) by a bandwidth portion for a signal, the processing of which has been stopped. Alternatively, a reduced width of the transmission bandwidth adjusted by the transmission/reception switching circuits 9, 17 may be less than the bandwidth portion for a signal, the processing of which has been stopped.

Further, in the foregoing embodiment, when an improvement in transmission quality is instructed, the total transmission bandwidths for signals subjected to the instructed improvement in transmission quality are expanded by a bandwidth portion for a signal, the processing of which has been stopped. Alternatively, the entire bandwidths may be expanded by less than the bandwidth portion for the signal, the processing of which has been stopped. In addition, signals subjected to an instructed improvement in transmission quality are preferably video signals R, G, B, in which case the bandwidths for the respective video signals R, G, B are preferably expanded by a predetermined width as illustrated in FIG. 10.

As described above, when any of the prompt video signal P, the return video signal M and the audio signal A5 transmitted from the CCU 2 to the camera 1 is not necessary or is determined to be unusual, the operation of a circuit portion processing the unnecessary or unusual signal and the transmission thereof are stopped or set into a stand-by state, the transmission bandwidth of the transmission path is reduced by a portion otherwise assigned to the unnecessary or unusual signal, and the bandwidth limitation ratio, the data compression ratio and the modulation ratio for signals other than the unnecessary or unusual signal are controlled to expand the transmission band for the remaining signals.

It is therefore possible to stop or set into a stand-by state a portion of circuit associated with a signal which is not transmitted in accordance with transmission situation, thus always minimizing power consumption. In addition, when the transmission bandwidth is reduced, the resulting simplified circuit configuration and lower operation speed further contribute to reduced power consumption and extended transmission distance. On the other hand, when the transmission bandwidths are expanded for signals except for a signal which is not transmitted, the most required signal can be provided with an improved quality and transmitted.

It should be noted that the stoppage or the transition to a stand-by state of the transmission operation in the transmission signal transmitter circuit 5 at step 710 and the stoppage or the transition to the stand-by state of the reception operation in the transmission signal receiver circuit 19 at step 810 are performed in synchronism with a synchronization signal. Preferably, the operations associated with the reduction of a bandwidth and with the improvement in transmission quality at steps 718, 722, 736, 818, 822, 834, 836 are also performed in synchronism with the synchronization signal.

Next, the operation of switching a video signal displayed on the view finder (VF) 22 between a return video signal M and video signals R, G, B in the camera 1 will be explained with reference to timing charts illustrated in (a)–(h) of FIG. 11.

It should be noted that in this embodiment, the return video signal M from the CCU 2 is synchronized with the video signals R, C, B in the camera 1, as is apparent from FIGS. 11, 5. A synchronization signal illustrated in (d) of FIG. 11 is extracted from the video signals R, G, B and supplied to the control circuit 14.

First, explanation will be given of the operation of switching a video signal supplied to the view finder 22 from the return video signal M to the video signals R, G, B.

Assume first that the camera man 26 (FIG. 4) has manipulated the manipulation panel of the camera 1 to input a signal D ((a) of FIG. 11) indicative of an instruction to "switch a video signal supplied to the view finder 22 from the return video signal M to the video signals R, G, B" to the terminal T5 at time g. The control circuit 14 responsively supplies the selector circuit 33 with a control signal D3 ((e) of FIG. 11) indicative of an instruction to "switch from he return video signal M to the video signals R, G, B" at time k positioned substantially at the center of a synchronization signal (blanking period) immediately after time a at which the signal D has been inputted, i.e., at time k positioned substantially at the center of non-signal periods of both the return video signal M and the video signals R, G, B. In this way, the selector circuit 33 switches its output from the return video signal M to the video signals R, G, B, so that a video signal displayed on the view finder 22 is switched from the return video signal M to the video signals R, G, B at time k ((h) of FIG. 11). Thus, since the video signal to the view finder 22 is switched during non-signal periods of the return video signal M and the video signals R, G, B, an image viewed on the view finder 22 will not be disturbed.

Afterwards, the control circuit 14 supplies the transmission signal receiver circuit 19 with a control signal D4 ((f) of FIG. 11) indicative of an instruction to "stop or set into a stand-by state the operation of a receiver section associated with the return video signal M in the transmission signal receiver circuit 19" at time i positioned substantially at the center of the next synchronization signal (next blanking period). In response to the control -signal D4, the transmission signal receiver circuit 19 stops or sets into the stand-by state the operation of the receiver section associated with the return video signal M. The control signal D4 may be generated at time k in synchronism with the control signal D3, such that the transmission signal receiver circuit 19 stops or sets into a stand-by state the operation of the receiver section associated with the return video signal M at time k.

Next, explanation will be given of the operation of switching a video signal supplied to the view finder 22 from the video signals R, G, B to the return video signal M.

Assume first that the camera man 26 has manipulated the manipulation panel of the camera 1 to input a signal D indicative of an instruction to "switch a video signal supplied to the view finder 22 from the video signals R, G, B to the return video signal M" to the terminal T5 at time h. The control circuit 14 responsively supplies the transmission signal receiver circuit 19 with a control signal D4 indicative of an instruction to "start the reception operation of the receiver section associated with the return video signal M in the transmission signal receiver circuit 19" at time j positioned substantially at the center of the synchronization signal (blanking period) immediately after time h at which the signal D has been inputted, i.e., at time j positioned substantially at the center of non-signal periods of both the return video signal M and the video signals R, G, B. In this way, the transmission signal receiver circuit 19 starts the operation of the receiver section associated with the return video signal M.

Subsequently, the control circuit 14 supplies the selector circuit 33 with a control signal D4 indicative of an instruction to "switch from the video signals R, G, B to the return video signal M" at time 1 positioned substantially at the center of the next synchronization signal (nest blanking period), i.e., at time 1 positioned substantially at the center of non-signal periods of both the return video signal M and the video signals R, G, B. In response to the control signal D4, the selector circuit 33 switches its output from the video signals R, G, B to the return video signal M, so that the video signal displayed on the view finder 22 is switched from the video signals R, G, B to the return video signal M at time 1.

Thus, since the output of the selector circuit 33 is switched from the video signals R, G, B to the return video signal M after the lapse of a time period required for the receiver circuit 19 to perform a normal reception operation after starting a reception operation (here, this time period is one period of the synchronization signal), a stable image can be provided on the view finder 22 when the video signals R, G, B have been switched to the return video signal M.

As described above, the receiver circuit 19 is operated only when the return video signal M is selected as a VF video signal, and the VF video signal is switched during a non-signal period of video data in the unit of fields or frames, so that the VF video signal can be received from the start to the end of a field or a frame during a signal period without any interruption, thus making it possible to properly output the VF video signal to the view finder 22 without disturbing the image on the view finder 22 or the synchronization of the image.

While in this embodiment, a bi-directional transmission configuration between a camera and a CCU has been taken as an example, where the transmission is stopped for a transmission signal sent from the CCU to the camera, the present invention is not limited to this particular configuration. In addition, the transmission stopping operation may be also performed on a transmission signal sent from the camera to the CCU to further reduce entire power consumption.

Also, it goes without saying that the present invention is not limited to the bi-directional transmission between a camera and a CCU, and can be applied similarly to bi-directional transmission between a camera and a field pick-up unit (FPU) or between a camera and a transmission apparatus such as a cable television, and so on.

While in the foregoing embodiment, video signals transmitted from the camera 1 onto the transmission path 3 are R, G, B components, tree video signals consisting of a luminance signal Y and two color difference signals Cr, Cb may be used instead of the video signals R, G, B.

Also, while the foregoing embodiment has been described in connection with a method of bi-directionally transmitting multiplexed signals between a camera and a CCU through a single transmission path as illustrated in FIG. 3 (i.e., methods shown in U.S. Ser. No. 08/361,724 and EP Patent Application No. 94309860.8), the present invention may be bi-directional transmission of multiplexed signals on a single transmission path by any other method.

It should be also noted that the present invention may be applied to a system which is separately provided with a transmission path for transmitting signals R, G, B, A1–A4, D1 from the camera 1 and a transmission path for transmitting signals M, P, A5, D2 from the CCU 2. In this case, the transmission/reception switching circuits 9, 17 are not required.

According to the present invention as described above, if a plurality of signals to be transmitted through a predetermined transmission path include a signal which need not be transmitted or a signal which is determined to be unusual, the operation of a circuit portion processing such a signal and the transmission thereof are stopped, so that the power consumption can be reduced to a level minimally required for the operation of the entire transmission system.

Additionally, if the transmission bandwidth of the transmission path is reduced together with the stoppage of the operation of a circuit portion associated with a signal which is not transmitted, the circuit configuration associated with the transmission path is simplified, and the operation speed is reduced, so that less power consumption is required and the transmission bandwidth is reduced, thereby making it possible to extend a transmission distance.

Further, if transmission bandwidths are expanded for signals other than a signal which is not transmitted, the transmission bandwidths, which have been limited by processing such as bandwidth limitation, data compression, and so on, can be expanded, so that the most required signal can be provided with a higher quality and transmitted.

Furthermore, even if a transmission signal and a reception signal are selectively switched and a reception operation is stopped when the reception signal is not selected, the signal switching operation is performed during a non-signal period of the signal, thus making it possible to receive the reception signal from the start to the end of a signal period without any interruption, with the result that the signal and the synchronization thereof will not be disturbed, and a properly switched signal can be provided.

What is claimed is:

1. In a transmission system for bi-directionally transmitting a plurality of signals between two transmission/reception units interconnected through transmission means, a transmission control method comprising the step of:

when at least one of said plurality of signals is subjected to one of a transmission disabled condition, a transmission not required state, a reception disabled state and a reception not required state, stopping or setting into a stand-by condition at least one of a transmission operation or a reception operation for said at least one signal of said plurality of signals remaining in said one state.

2. A transmission control method according to claim 1, further comprising the step of:

reducing a transmission bandwidth of said transmission means by a predetermined bandwidth in accordance with a bandwidth assigned to said at least one signal of said plurality of signals.

3. A transmission control method according to claim 2, wherein:

said predetermined bandwidth is a bandwidth assigned to said at least one signal of said plurality of signals.

4. A transmission control method according to claim 1, further comprising the step of:

expanding a transmission bandwidth for at least one predetermined signal of the remaining signals except for said at least one signal within said plurality of signals by a predetermined bandwidth without changing the transmission bandwidth of said transmission means.

5. A transmission control method according to claim 4, wherein:

said predetermined bandwidth is a bandwidth assigned to said at least one signal of said plurality of signals.

6. A transmission control method according to claim 1, wherein:

said transmission means comprises a single transmission path, and said plurality of signals are bi-directionally transmitted in a time-division-multiplex manner between said two units through said transmission means.

7. A transmission control method according to claim 1, further comprising the step of:

in one transmission/reception unit of said two transmission/reception units, selectively outputting to an output terminal of said one transmission/reception unit, a reception signal transmitted from the other transmission/reception unit of said two transmission/reception units to said one transmission/reception unit through said transmission means and a transmission signal transmitted from said one transmission/reception unit to said the other transmission/reception unit through said transmission means;

said selectively outputting step further comprising the steps of:

outputting said transmission signal to said output terminal during a non-signal period of said transmission signal instead of said reception signal, when switching a signal to be outputted to said output terminal from said reception signal to said transmission signal; and starting a reception operation for said reception signal, and outputting said reception signal to said output terminal during a non-signal period of said reception signal instead of said transmission signal after said reception operation has been properly performed, when switching a signal outputted to said output terminal from said transmission signal to said reception signal.

8. A transmission system for bi-directionally transmitting a first plurality of signals and a second plurality of signals through transmission means between a first transmission/reception unit and a second transmission/reception unit interconnected through said transmission means, wherein:

said first transmission/reception unit comprises:
first transmission means for transmitting said first plurality of signals to said transmission means;
first determination means for determining states of said plurality of signals to be transmitted;
first control means responsive to a determination result of said first determination means for stopping or setting into a stand-by state a transmission operation in said first transmission means for at least one signal within said first plurality of signals corresponding to said determination result; and
first reception means for receiving said second plurality of signals transmitted from said second transmission/reception unit through said transmission means, and said second transmission/reception unit comprises:
second reception means for receiving said first plurality of signals transmitted from said first transmission/reception unit through said transmission means;
second determination means for determining states of said first plurality of signals received by said second reception means;
second control means responsive to a determination result of said determination means for stopping or setting into a stand-by state a reception operation in said second reception means for at least one signal within said first plurality of signals; and
second transmission means for transmitting said second plurality of signals to said transmission means, said first control means, responsive to a first determination result made by said first determination means that at least one signal of said first plurality of signals is in one of a transmission disabled state and a transmission not required state as said determination result, for stopping or setting into a stand-by state a transmission operation in said first transmission means for at least one signal of said first plurality of signals indicated by said first determination result,
said second control means, responsive to a second determination result made by said second determination means that at least one signal of said first plurality of signals is in one of a reception disabled state and a reception not required state as said determination result, for stopping or setting into a stand-by state a reception operation in said second reception means for said at least one signal of said first plurality of signals indicated by said second determination result.

9. A transmission system according to claim 8, wherein:
said first control means includes means responsive to said first determination result made by said first determination means for transmitting to said second transmission/reception unit through said transmission path a first signal for instructing said second transmission/reception unit to stop a reception operation for said at least one signal of said first plurality of signals indicated by said first determination result; and
said second control means includes means for stopping or setting into a stand-by state a reception operation in said second reception means for said at least one signal of said first plurality of signals indicated by said first signal.

10. A transmission system according to claim 8, wherein:
said second control means includes means responsive to said second determination result made by said second determination means for transmitting to said first transmission/reception unit through said transmission path a second signal for instructing said first transmission/reception unit to stop a transmission operation for said at least one signal of said first plurality of signals indicated by said second determination result; and
said first control means includes means for stopping or setting into a stand-by state a transmission operation in said first transmission means for said at least one signal of said first plurality of signals indicated by said second signal.

11. A transmission system according to claim 8, wherein:
said first transmission/reception unit further includes first instruction means for giving a first instruction for instructing to stop a transmission operation for said at least one signal of said first plurality of signals,
said first determination means includes means responsive to said first instruction for determining that at least one signal of said first plurality of signals is in a transmission not required state,
said first control means includes:
means for stopping or setting into a stand-by state a transmission operation in said first transmission means for said at least one signal in said first plurality of signals which has been determined to be in said transmission not required state by said first instruction means; and
means for transmitting to said second transmission/reception unit through said transmission path a first signal for instructing to stop a reception operation for said at least one signal of said first plurality of signals indicated by said first instruction means, and
said second control means includes means for stopping or setting into a stand-by state a reception operation in said second reception means for said at least one signal of said first plurality of signals indicated by said first signal.

12. A transmission system according to claim 8, wherein:
said second transmission/reception unit further includes second instruction means for giving a second instruction for instructing to stop a reception operation for said at least one signal of said first plurality of signals,
said second determination means includes means responsive to said second instruction for determining that at least one signal of said first plurality of signals is in a reception not required state,
said second control means includes:
means for stopping or setting into a stand-by state a reception operation in said second reception means for said at least one signal of said first plurality of signals indicated by said second instruction means; and
means for transmitting to said first transmission/reception unit through said transmission path a second signal for instructing to stop a transmission operation for said at least one signal of said first plurality of signals indicated by said second instruction means, and
said first control means includes means for stopping or setting into a stand-by state a transmission operation in said first transmission means for said at least one signal of said first plurality of signals indicated by said second signal.

13. A transmission system according to claim 8, wherein:

said first control means includes means, responsive to said first determination result made by said first determination means, for reducing a transmission bandwidth of said transmission means by a predetermined bandwidth in accordance with a bandwidth assigned to said at least one signal of said first plurality of signals, and said second control means includes means, responsive to said second determination result made by said second determination means, for reducing the transmission bandwidth of said transmission means by a predetermined bandwidth in accordance with the bandwidth assigned to said at least one signal of said first plurality of signals.

14. A transmission system according to claim 13, wherein:

said predetermined bandwidth is the bandwidth assigned to said at least one signal of said first plurality of signals.

15. A transmission system according to claim 8, wherein:

said first control means includes means, responsive to said first determination result made by said first determination means, for expanding a transmission bandwidth for at least one signal of said second plurality of signals received by said first reception means by a predetermined bandwidth without changing the transmission bandwidth of said transmission means; and said second control means includes means, responsive to said second determination result made by said first determination means, for expanding a transmission bandwidth for at least one signal of said second plurality of signals transmitted from said second transmission means by a predetermined bandwidth without changing the transmission bandwidth of said transmission means.

16. A transmission system according to claim 15, wherein:

said predetermined bandwidth is the bandwidth assigned to said at least one signal of said first plurality of signals.

17. A transmission system according to claim 8, wherein:

said first transmission means comprises a single transmission path, and said first plurality of signals and said second plurality of signals are bi-directionally transmitted in a time-division-multiplex manner between said first transmission/reception unit and said second transmission/reception unit through said transmission means, respectively.

18. A transmission system according to claim 17, wherein:

said second plurality of signals includes video signals.

19. A transmission system according to claim 18, wherein:

said second transmission/reception unit is a television camera; and said first transmission/reception unit is a control unit for said television camera.

20. A transmission system according to claim 8, wherein:

said second transmission/reception unit further includes:
  output means;
  selection means for selectively outputting a third signal of said first plurality of signals received by said second reception means and a fourth signal of said second plurality of signals transmitted from said second transmission means to said output means; and
  selection control means for controlling said selection means, and
  said selection control means includes:
    means for outputting said fourth signal to said output means during a non-signal period of said fourth signal instead of said third signal when switching a signal outputted to said output means from said third signal to said fourth signal; and
    means for starting a reception operation for said third signal and outputting said third signal to said output terminal during a non-signal period of said third signal instead of said fourth signal after said reception operation has been properly performed when switching a signal outputted to said output means from said fourth signal to said third signal.

21. In a transmission system for bi-directionally transmitting a first plurality of signals and a second plurality of signals, each of said first and second pluralities of signals comprising non-signal periods and signal periods, through transmission means between a first transmission/reception unit and a second transmission/reception unit interconnected through said transmission means, a method for use in said second transmission/reception unit for selectively outputting a third signal of said first plurality of signals transmitted from said first transmission/reception unit to said second transmission/reception unit through said transmission means and a fourth signal of said second plurality of signals transmitted from said second transmission/reception unit to said first transmission/ reception unit through said transmission means to an output terminal of said second transmission/reception unit, said method comprising the steps of:

outputting said fourth signal during a non-signal period of said fourth signal to said output terminal instead of said third signal when switching a signal outputted to said output terminal from said third signal to said fourth signal; and starting a reception operation for said third signal and outputting said third signal to said output terminal during a non-signal period of said third signal instead of said fourth signal after said reception operation has been properly performed, when switching a signal outputted to said output means from said fourth signal to said third signal.

22. A transmission system for bi-directionally transmitting a first plurality of signals and a second plurality of signals, each of said first and second pluralities of signals comprising non-signal periods and signal periods, through transmission means between a first transmission/reception unit and a second transmission/reception unit interconnected through said transmission means, wherein:

said second transmission/reception unit comprises:
  reception means for receiving said first plurality of signals transmitted from said first transmission/ reception unit through said transmission means;
  transmission means for transmitting said second plurality of signals to said first transmission/reception unit through said transmission means;
  output means;
  selection means for selectively outputting a third signal of said first plurality of signals received by said reception means and a fourth signal of said second plurality of signals transmitted from said second transmission means to said output means; and
  selection control means for controlling said selection means, and
  said selection control means includes:

means for outputting said fourth signal to said output means during a non-signal period of said fourth signal instead of said third signal when switching a signal outputted to said output means from said third signal to said fourth signal; and means for starting a reception operation for said third signal and outputting said third signal to said output means during a non-signal period of said third signal instead of said fourth signal after said reception operation has been properly performed when switching a signal outputted to said output means from said fourth signal to said third signal.

* * * * *